(12) United States Patent
Lin et al.

(10) Patent No.: US 9,210,471 B2
(45) Date of Patent: Dec. 8, 2015

(54) DATA SAMPLING AND DATA ENCRYPTION/DECRYPTION METHOD AND ELECTRONIC DEVICE UTILIZING THE METHODS

(71) Applicant: MStar Semiconductor, Inc., Hsinchu Hsien (TW)

(72) Inventors: Chih-Hung Lin, Zhubei (TW); Tsung-Hsiu Ko, Zhubei (TW); Wei-Li Su, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 111 days.

(21) Appl. No.: 14/187,446

(22) Filed: Feb. 24, 2014

(65) Prior Publication Data

US 2014/0241526 A1 Aug. 28, 2014

(30) Foreign Application Priority Data

Feb. 27, 2013 (TW) .............................. 102107044 A

(51) Int. Cl.
*H04N 21/4405* (2011.01)
*H04N 21/4627* (2011.01)
*H04N 21/426* (2011.01)

(52) U.S. Cl.
CPC ..... *H04N 21/4627* (2013.01); *H04N 21/42623* (2013.01)

(58) Field of Classification Search
CPC ............ H04N 21/4627; H04N 2/4405; H04N 21/42623
See application file for complete search history.

(56) References Cited

U.S. PATENT DOCUMENTS

| | | | | |
|---|---|---|---|---|
| 3,857,103 A * | 12/1974 | Grazia | ............................... | 327/3 |
| 4,191,976 A * | 3/1980 | Braun | .............................. | 360/51 |
| 5,003,561 A * | 3/1991 | Dragotin | ....................... | 375/373 |
| 5,646,904 A * | 7/1997 | Ohno et al. | .............. | 365/233.14 |
| 6,058,152 A * | 5/2000 | Tanishima | .................... | 375/376 |
| 6,177,812 B1* | 1/2001 | Nagao et al. | ....................... | 327/7 |
| 6,519,340 B1* | 2/2003 | Javidi | .............................. | 380/28 |
| 7,280,093 B1* | 10/2007 | Hiroki | ........................... | 345/100 |
| 2002/0075048 A1* | 6/2002 | Miyamoto | ..................... | 327/158 |
| 2004/0196081 A1* | 10/2004 | Srinivasan et al. | ............. | 327/165 |
| 2005/0195009 A1* | 9/2005 | Mack et al. | ..................... | 327/235 |
| 2006/0098823 A1* | 5/2006 | Venes et al. | .................... | 380/219 |

(Continued)

OTHER PUBLICATIONS

Tektronix "Oscillocope Fundamentals," 2009, pp. 1-60, retrieved from http://circuitslab.case.edu/manuals/Oscilloscope_Fundamentals_-_Tektronix.pdf.*

(Continued)

*Primary Examiner* — Kaveh Abrishamkar
*Assistant Examiner* — James J Wilcox
(74) *Attorney, Agent, or Firm* — Edell, Shapiro & Finnan, LLC

(57) ABSTRACT

In one embodiment of the present invention, a signal sampling method is provided. It comprises: (a) sampling an input signal with respect to a sampling clock signal; (b) calculating a maximum transition timing and a minimum transition timing of the input signal according to a relation between the sampling in step (a) and a reference timing clock; (c) defining a voltage level transition interval according to the maximum transition timing and the minimum transition timing; and (d) determining phase of the sampling clock signal or phase of the input signal according to the voltage level transition interval.

22 Claims, 20 Drawing Sheets

(56) References Cited

U.S. PATENT DOCUMENTS

| | | | |
|---|---|---|---|
| 2007/0280392 A1* | 12/2007 | De Laurentiis et al. | 375/355 |
| 2009/0028328 A1* | 1/2009 | Munsell et al. | 380/239 |
| 2009/0230947 A1* | 9/2009 | Sumita | 324/76.11 |
| 2011/0194689 A1* | 8/2011 | Zhu | 380/222 |
| 2012/0189121 A1* | 7/2012 | Duval et al. | 380/255 |
| 2013/0044874 A1* | 2/2013 | Murray | 380/44 |
| 2014/0055166 A1* | 2/2014 | Kotowski et al. | 327/55 |
| 2015/0033251 A1* | 1/2015 | Koo et al. | 725/31 |
| 2015/0049835 A1* | 2/2015 | Shibata | 375/287 |
| 2015/0121121 A1* | 4/2015 | Cebulla et al. | 714/3 |

OTHER PUBLICATIONS

Tektronix "Triggering Fundamentals," 2011, pp. 1-28, retrieved from www.tek.com/dl/55W_17291_6_0.pdf.*

* cited by examiner

DATA SAMPLING AND DATA ENCRYPTION/DECRYPTION METHOD AND ELECTRONIC DEVICE UTILIZING THE METHODS

CROSS REFERENCE TO RELATED APPLICATIONS

This application claims priority under 35 U.S.C 119 to Taiwan patent application, TW102107044, filed on Feb. 27, 2013, the disclosure of which is incorporated herein by reference.

BACKGROUND OF THE INVENTION

1. Field of the Invention

The present invention relates to signal sampling method, data encryption/decryption method and electronic device utilizing the methods, and more particularly, to a signal sampling method for calculating an interval of voltage level transition of input signal in order to set up phase of input signal or sampling clock signal, data encryption/decryption method and electronic device utilizing the methods.

2. Description of the Prior Art

Conditional access module (CAM) is utilized to decrypt encrypted image data. PCMCIA (personal computer memory card international association) cards for digital televisions (TV) are exemplary species of CAM. For example, after paying fee to digital TV premium channel operator, CAM equipped with decryption chip is provided to user. In another example, corresponding decryption program or serial code is provided by operator if user owns CAM already. Therefore the CAM is capable to decrypt the television data stream encrypted by operator.

The classic decryption flow of CAM could be categorized into two kinds. First, the decrypted TV data stream is stored and encrypted again by another encryption method. Once user wants, the stored and encrypted TV data stream would be decrypted and played. In this example, the locally encrypted TV data stream is stored in a storage device other than CAM. It is possible to retrieve the encrypted TV data stream from the separate storage device and to manipulate and decrypt the stolen TV data stream. In such architecture, the protection to TV data stream is not very well. In alternative architecture, the encrypted TV data stream is stored without being decrypted. Once user wants to play, the stored encrypted TV data stream is sent to CAM for decryption and play. Since operator is required to provide CAM or associated information for decrypting the TV data stream in the second scenario, the protective strength is stronger than the first one.

Please refer to FIG. 1, which is a block diagram of a digital TV device 100 equipped with CAM in the prior art. The digital TV device 100 adopted the mentioned second mechanism, i.e., the encrypted TV data stream is stored without being decrypted and is sent to CAM for decryption and play. As shown in FIG. 1, the digital TV device 100 comprises an antenna 101, a tuner 103, a demodulator 105, a data access control device 107, and a CAM 109. The antenna 101 is configured to receive TV data signal comprising signal encrypted by channel operator. The tuner 103 is configured to tune the frequency to receive a specified channel. The demodulator 105 receives TV data signal from the tuner 103, demodulates the input signal and performs channel calibration, synchronization, forward error connection, channel encoding, and etc. Because the tuner 103 and the demodulator 105 in the digital TV device 100 are well-known to one with ordinary skill in the art, the present invention has no further discussions on them. The original TV data (SD) such as MPEG (Motion Picture Experts Group) transport stream processed by the tuner 103 and the demodulator 105 is transmitted to the data access control device 107. As mentioned above, the original TV data (SD) is stored in the data access control device 107. Once the data access control device 107 receives an output command, the stored original TV data SD' is outputted to the CAM 109 for decryption and the decrypted TV data CD is generated accordingly. The decrypted TV data CD may be sent directly to display or manipulated by some sorts of image processing such as image timing calibration or image contrast enhancement. In some applications, the decrypted TV data CD may be sampled as sampled TV data SCD according to sampling clock signal CLKs for further uses.

After decryption steps performed on the original TV data SD' by the CAM 109, the timing of the decrypted TV data CD may be drifted from the original TV data SD' due to the influence of internal signal paths and loads of CAM 109. As a result, the voltage level transition timing may be drifted accordingly. Take FIG. 2 as an example, the voltage level transition timings of the original TV data SD' are at $T_1$ and $T_2$. After decryption procedure processed by the CAM 109, the voltage level transition timing of the decrypted TV data CD are shifted to $T_1'$ and $T_2'$. In case of sampling point $SP_2$, it falls in the interval with no voltage change. Hence the sampled value of the sampling point $SP_2$ is correct. However, in case of sampling point $SP_1$, it samples on the voltage level transition timing $T_1'$. The sampled value may be wrong comparing to sampling the original timing $T_1$. Furthermore, since internal signal paths and loads of various CAM 109 manufactured by different vendors are not the same, it is difficult to calibrate timing shift error of each CAM 109.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

One of the objectives of the present invention is to provide signal sampling method and electronic device utilizing the method, which can detect a voltage level transition interval of a signal in order to set up more appropriate sampling points.

Another one of the objectives of the present invention is to provide signal encryption/decryption method and electronic device utilizing the method, which can detect a voltage level transition interval of an encrypted/decrypted signal in order to set up more appropriate sampling points.

In one embodiment of the present invention, a signal sampling method is provided. It comprises: (a) sampling an input signal with respect to a sampling clock signal; (b) calculating a maximum transition timing and a minimum transition timing of the input signal according to a relation between the sampling in step (a) and a reference clock signal; (c) defining a voltage level transition interval according to the maximum transition timing and the minimum transition timing; and (d) determining phase of the sampling clock signal or phase of the input signal according to the voltage level transition interval.

In another embodiment of the present invention, it provides a signal sampling device. It comprises a sampling circuit, configured for sampling an input signal with respect to a sampling clock signal; and a control unit, configured for calculating a maximum transition timing and a minimum transition timing of the input signal according to a relation between the sampling in the sampling step performed by the sampling circuit and a reference clock signal; defining a voltage level transition interval according to the maximum transition timing and the minimum transition timing; and determining phase of the sampling clock signal or phase of the input signal according to the voltage level transition interval.

The present invention further provides signal encryption/decryption method utilizing the fore-mentioned signal sampling method and signal encryption/decryption device utilizing the fore-mentioned signal sampling device. Since the signal encryption/decryption method and device are similar to the signal sampling method and device, no duplicated description is discussed.

According to the fore-mentioned embodiments, an interval of possible voltage level transition occurs to an input signal can be detected such that samplings are performed at more appropriate timings. Moreover, a determination flow is provided in accordance with the present invention for determining the most precise voltage level transition interval in various signal circumstances.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
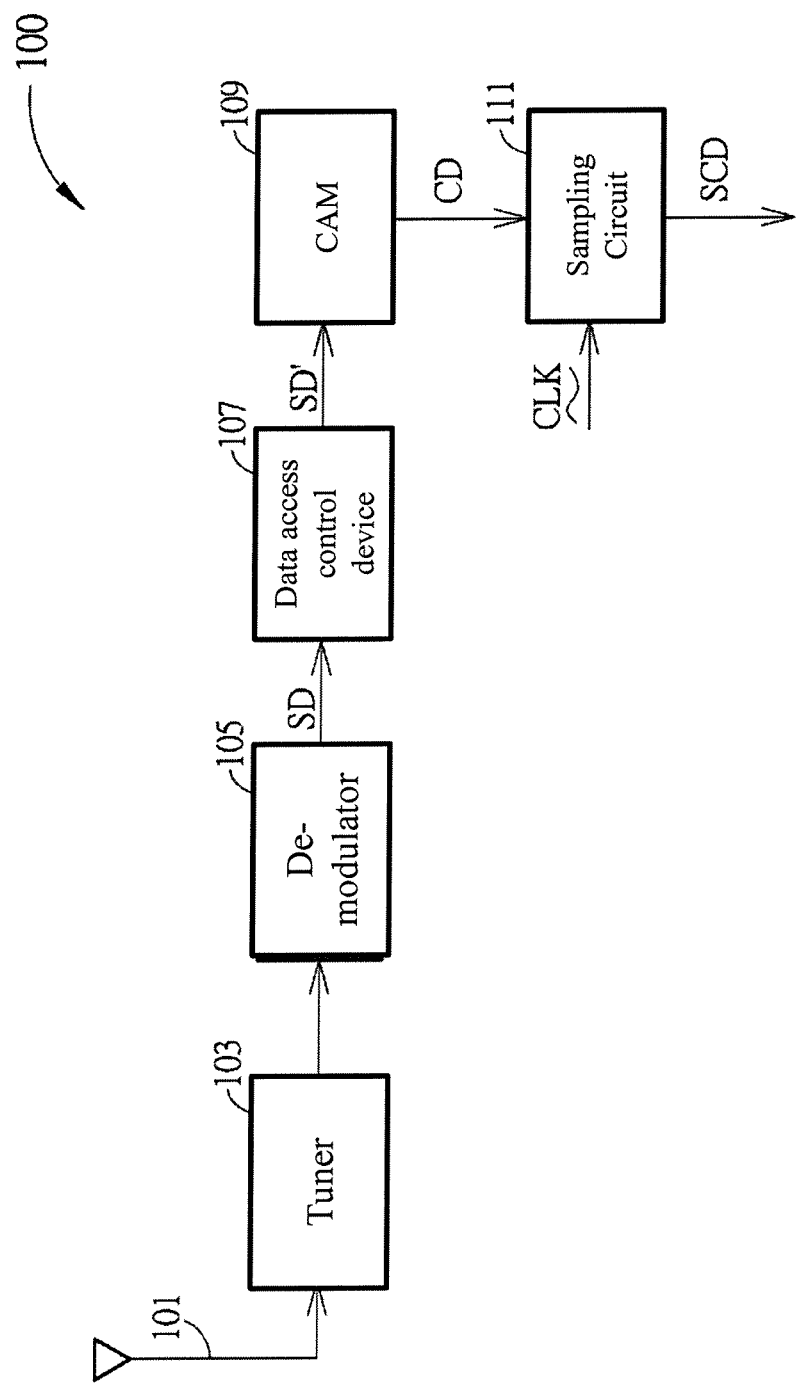
FIG. 1 is a block diagram of a digital TV device equipped with conditional access module (CAM) in the prior art.
Figure 2:
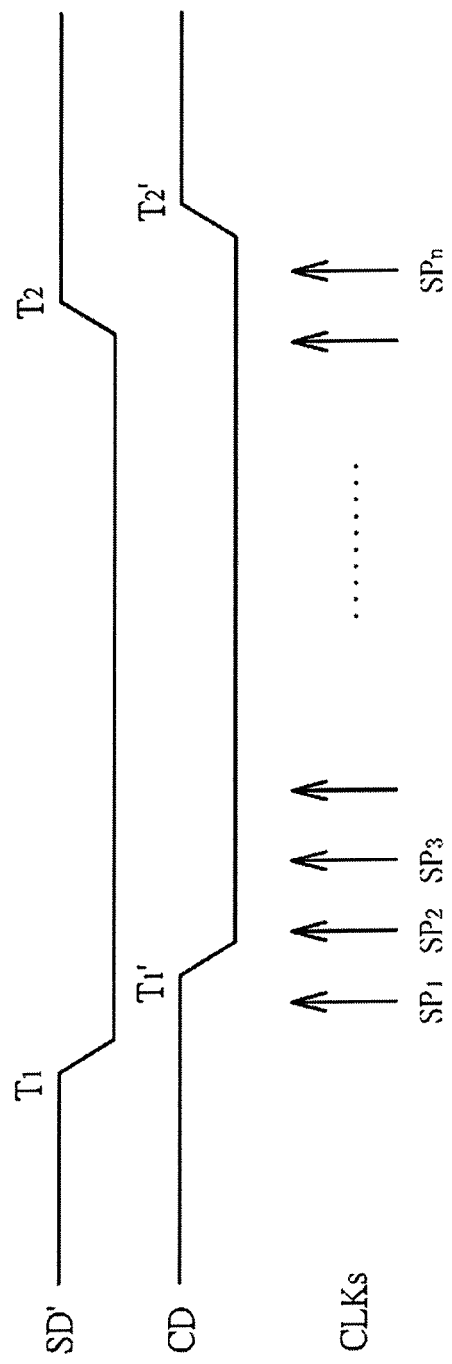
FIG. 2 is a diagram illustrating timing drift occurs to signal in the prior art.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 3:
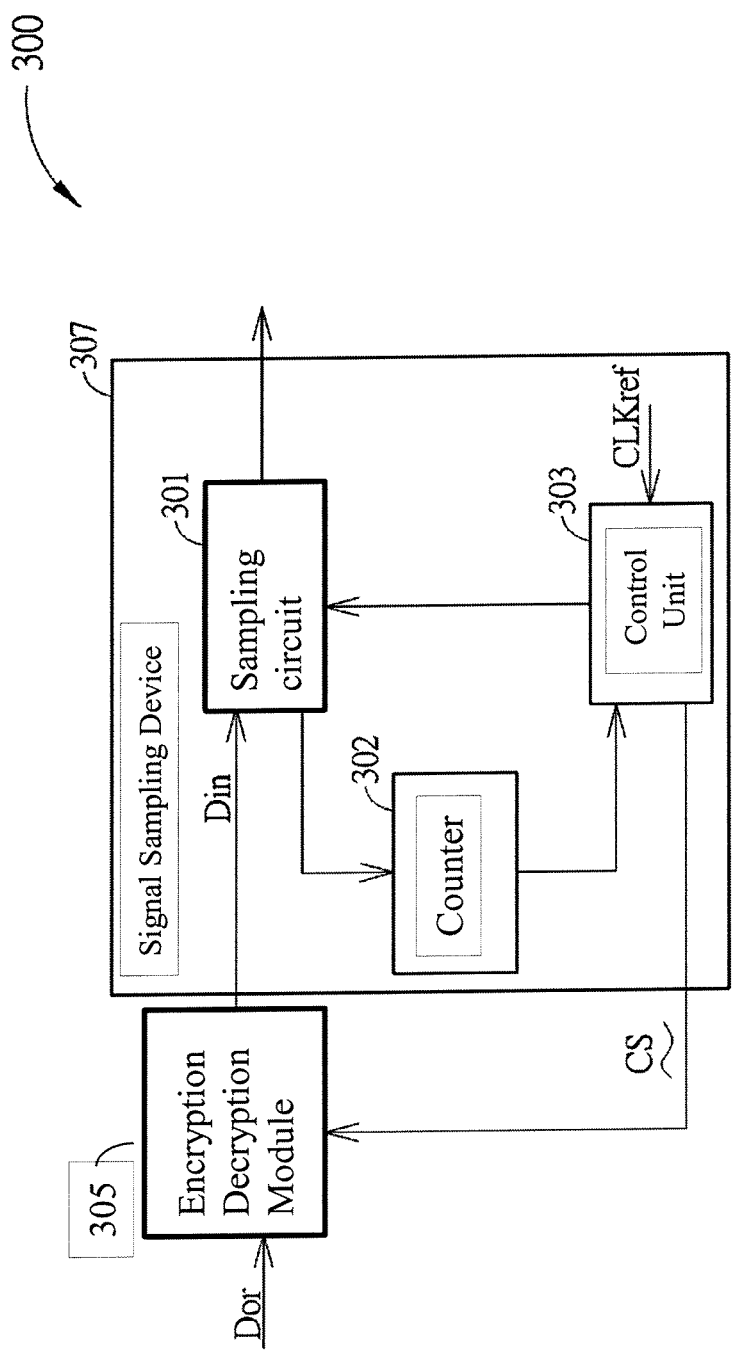
FIG. 3 is a block diagram of a signal encryption/decryption device and a signal sampling device in accordance with an embodiment of the present invention.

Please refer to FIG. 3, which shows a block diagram of a signal encryption/decryption device and a signal sampling device in accordance with an embodiment of the present invention. As shown in FIG. 3, the signal encryption/decryption device 300 comprises a sampling circuit 301, a control unit 303 and an encryption/decryption module 305. The encryption/decryption module 305 is configured to encrypt or decrypt an original signal D, to generate an input signal $D_{in}$. The sampling circuit 301 samples the input signal $D_{in}$ according to a sampling clock signal $CLK_s$. The control unit 303 calculates a maximum transition timing $Max_T$ and a minimum transition timing $Min_T$ according to a relation between the samplings of the sampling circuit 301 and time periods of a reference clock signal $CLK_{ref}$. The control unit 303 defines voltage level transition interval of the input signal $D_{in}$ according to the maximum transition timing $Max_T$ and the minimum transition timing $Min_T$. In other words, the control unit 303 calculates most possible time interval that the input signal $D_{in}$ may have voltage level transition after calculation of the maximum transition timing $Max_T$ and the minimum transition timing $Min_T$. According to the voltage level transition interval, the control unit 303 determines phase of the sampling clock signal $CLK_s$ or generates a control signal CS for the encryption/decryption module 305 to determine the phase of the input signal $D_{in}$ such that sampling occurs outside the voltage level transition interval. The encryption/decryption module 305 may be the fore-mentioned conditional access module (CAM) or any other encryption/decryption device. Besides, the sampling circuit 301 and the control unit 305 may be constructed as an independent signal sampling device, which can be configured to determine sampling timings on any signal in addition to sampling the signals processed by the encryption/decryption device. The present invention does not intend to limit applicable scenarios to the samplings the processed signal by the encryption/decryption device. Besides, a counter 302 shown in FIG. 3 is configured to calculate the relation between the voltage level transition timings of the input signal $D_{in}$ and time periods of the reference clock signal $CLK_{ref}$. However, the present invention does not intend to limit the embodiments to using the counter for calculating the voltage level transition timings. Ordinary skilled in the art may use other mechanisms to realize the calculation. If other mechanism is realized, the embodiment shown in FIG. 3 may exclude the counter 302.

Figure 4:
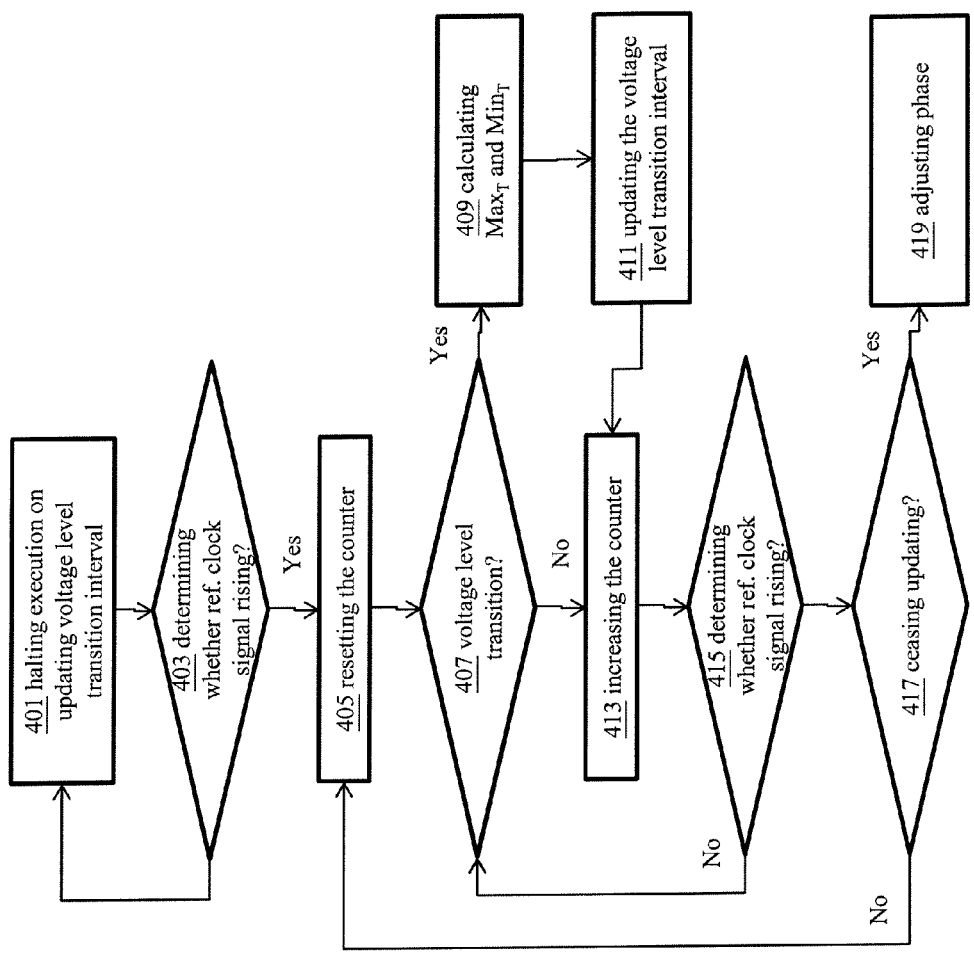
FIG. 4 is a flowchart diagram of the signal sampling device shown in FIG. 3.

Please refer to FIG. 4, which is a flowchart diagram of the signal sampling device shown in FIG. 3. The flow comprises the following steps.

Step 401: Halting execution on updating voltage level transition interval. It is not required to make the whole signal sampling device in halt. The signal sampling device may perform samplings according to initially or previously determined voltage level transition interval.

Step 403: determining whether the reference clock signal $CLK_{ref}$ is at rising edge (i.e., transition from low voltage level to high voltage level.) If so, the flow continues to updating voltage level transition interval (step 405 to 415); otherwise, the flow goes back to step 401. In other words, updating voltage level transition can be triggered by the rising edge of the reference timing clock signal $CLK_{ref}$ but is not limited thereto. Step 405: resetting the counter to zero.

Step 407: determining whether the input signal has voltage level transition. If so, the flow goes to step 409 which records and marks the counter value when the voltage level transition occurs as the maximum transition timing $Max_T$ or the minimum transition timing $Min_T$. The following step 411 is performed to update the voltage level transition interval according to the maximum transition timing $Max_T$ and the minimum transition timing $Min_T$. Then the flow goes to step 413 to increase the counter value by one (1).

If the determining result of step 407 is negative, the flow directly jumps to step 413 to increase the counter value by one (1).

Step 409: calculating the maximum transition timing $Max_T$ or the minimum transition timing $Min_T$.

Step 411: updating the voltage level transition interval.

Step 413: increasing the counter value by one (1).

Step 415: determining whether the reference clock signal $CLK_{ref}$ is at rising edge. If so, it ends the steps for updating the voltage level transition interval and the flow goes to step 417; otherwise, the flow returns to step 407.

Step 417: ceasing updating the voltage level transition interval.

Step 419: adjusting phase of the sampling clock signal or the input signal according to the recorded voltage level transition interval.

Figure 8A:
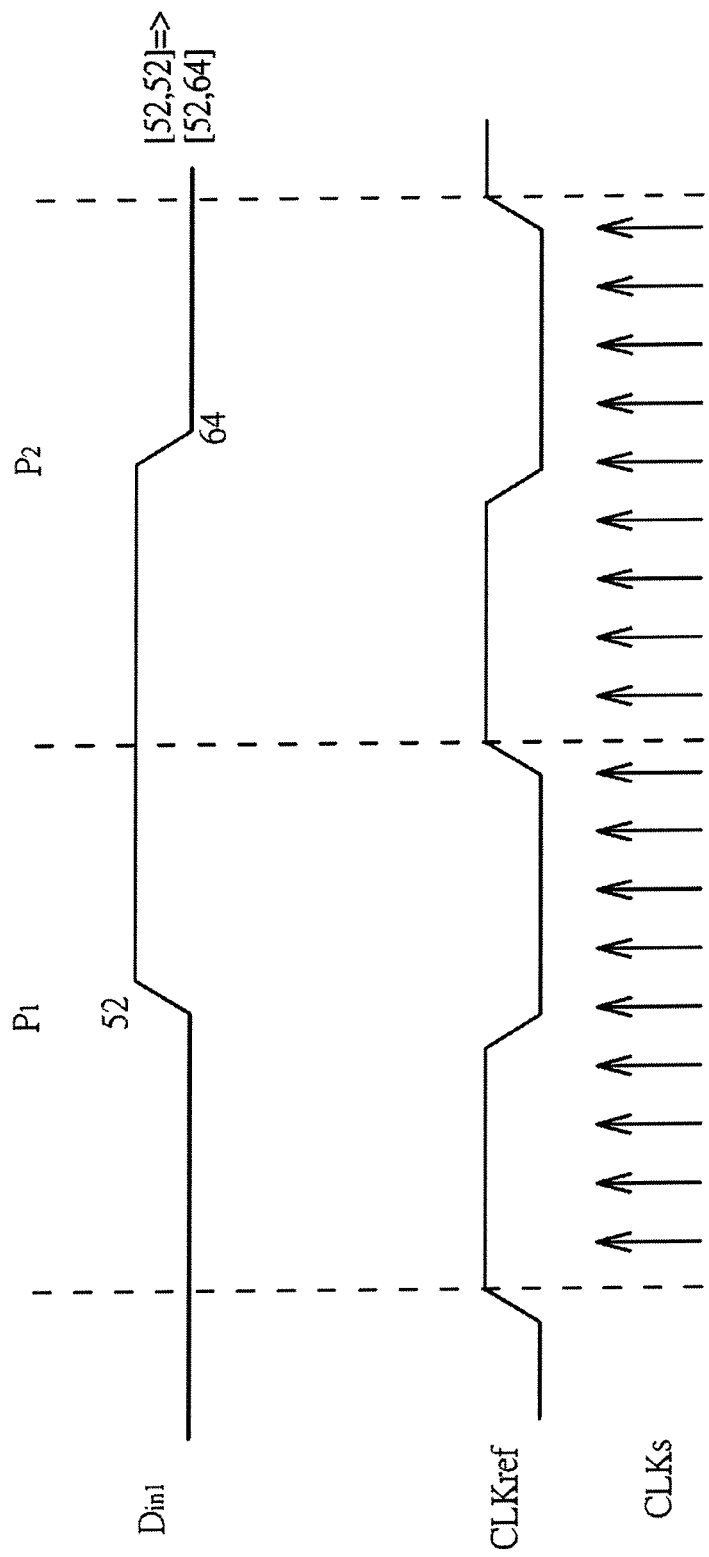

Take the input signal $D_{in1}$ shown in FIG. 8A as an example; the following discussion describes details of steps 407 to 415. Please refer to FIG. 4 and FIG. 8A together for better understanding the present invention. Please be advised that the embodiment shown in FIG. 8A is one example of sampling in accordance with the present invention. It is used to describe but not to limit the steps shown in FIG. 4. Please refer to FIG. 8A, triggered by rising edge of the reference clock signal $CLK_{ref}$, each sampling (arrows shown in FIG. 8A) increases the counter value by one (1). If no voltage level transition occurs to input signal $D_{in1}$, the counter value continues to accumulate by samplings until a voltage level transition occurs to the input signal $D_{in1}$. Then, the instant counter value is recorded to be the maximum transition timing $Max_T$ or the minimum transition timing $Min_T$. After that, the counter value continues to accumulate until the next rising edge of the reference clock signal $CLK_{ref}$. Since the next rising edge represents that one cycle of the reference clock signal has passed, the counter is reset and it begins to count the next period. In the embodiment shown in FIG. 8A, first period $P_1$ of the input signal $D_{in1}$ starts from the first rising edge of the reference clock signal $CLK_{ref}$. In this example, a voltage level transition is detected when the counter value equals 52 during the first period $P_1$ and thus this counter value 52 is recorded and taken as the maximum transition timing $Max_T$ or the minimum transition timing $Min_T$. When the second rising edge of the reference clock signal occurs, the first period $P_1$ ends, the counter value is reset, and the second period $P_2$ starts. Another voltage level transition is detected when the counter value equals 64 during the second period $P_2$. Therefore the counter value 64 is recorded and taken as the maximum transition timing $Max_T$ or the minimum transition timing $Min_T$. The determination mechanism of the timing of the voltage level transition is which one of the maximum transition timing $Max_T$ or the minimum transition timing $Min_T$ would be discussed in later paragraphs.

Multiple combinations can be applied to different voltage level transitions, thus precision is required to determine the timing of the maximum transition timing $Max_T$ and the minimum transition timing $Min_T$. Please refer to FIG. 5, which shows a flowchart of detailed steps of calculating the maximum transition timing $Max_T$, the minimum transition timing $Min_T$ and steps of updating voltage level transition interval. The value Cnt represents the counter value at the time the voltage level transition occurs. The value $Max_T$ represents the maximum transition timing, value $Min_T$ represents the minimum transition timing, and T represents a time period of the reference clock signal $CLK_{ref}$. Because the determination formula of each step and the relations between steps are already clearly shown in FIG. 5, no further discussion is elaborated here.

Figure 5:
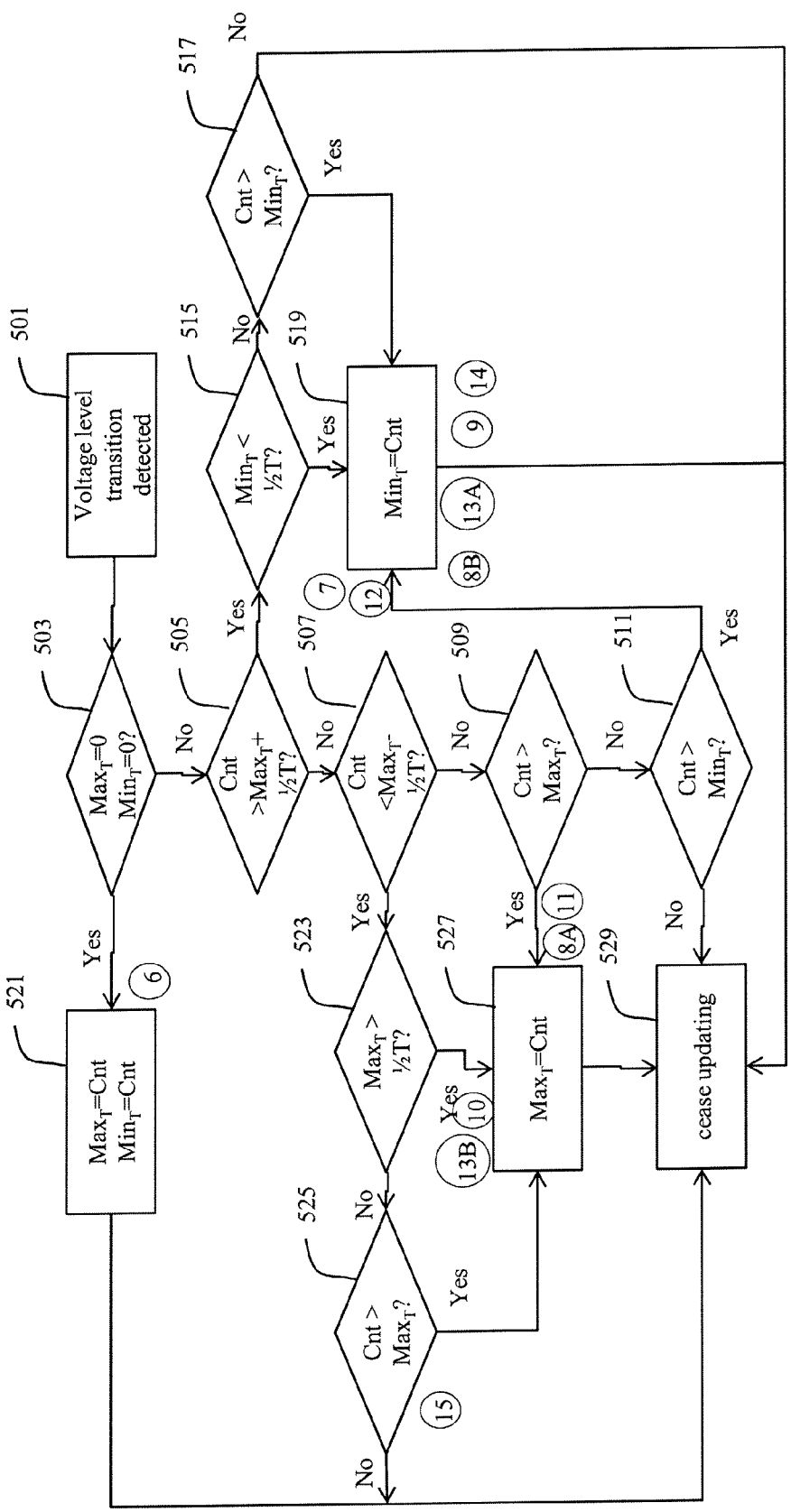
FIG. 5 is a flowchart of detailed steps of calculating the maximum transition timing $Max_T$, the minimum transition timing $Min_T$ and steps of updating voltage level transition interval shown in FIG. 4.
Figure 6:
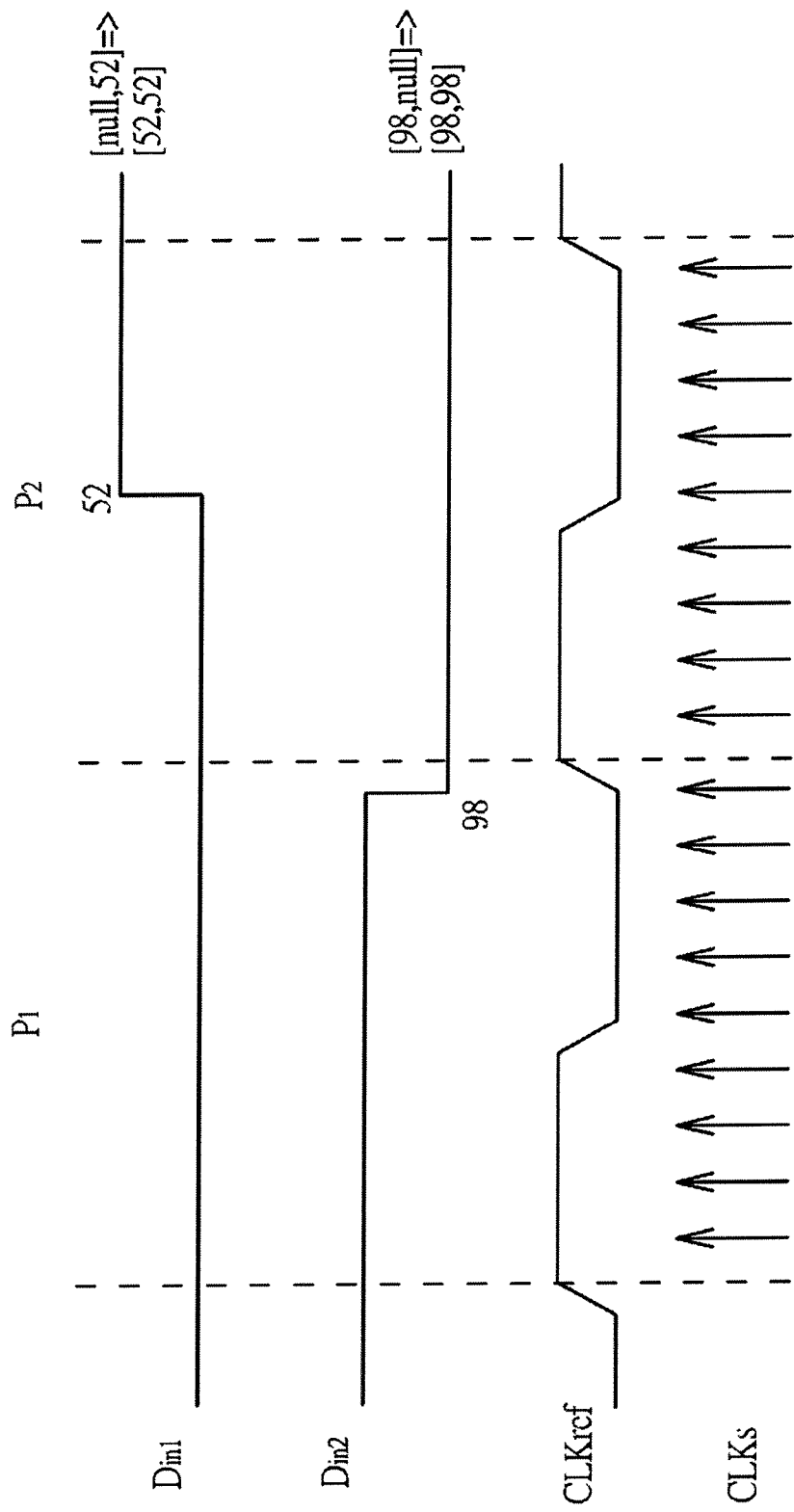
FIG. 6 to FIG. 15 show schematic diagrams of detailed steps of calculating the maximum transition timing $Max_T$, the minimum transition timing $Min_T$ and steps of updating voltage level transition interval shown in FIG. 5.

FIG. 6 to FIG. 15 show schematic diagrams of detailed steps of calculating the maximum transition timing $Max_T$, the minimum transition timing $Min_T$ and steps of updating voltage level transition interval shown in FIG. 5. Please refer to FIG. 5 and those diagrams to better understand the present invention. For example, there is an encircled number 6 besides step 521. It means that the determination flow of the last one voltage level transition step of the embodiment shown in FIG. 6 is corresponding to an exemplary flow goes through steps 501, 503, and 521.

In the embodiment shown in FIG. 6, defaults of the maximum transition timing $Max_T$ and the minimum transition timing $Min_T$ are initially 0. In the case where the input signal transits the voltage level at a first transition timing for the first time, the first transition timing is set as the maximum transition timing $Max_T$ and the minimum transition timing $Min_T$. Take the embodiment shown in FIG. 6 as an example, the input signal $D_{in1}$ keeps the voltage level during the first period $P_1$ and transits the voltage level when the counter value is 52 during the second period $P_2$. The maximum transition timing $Max_T$ and the minimum transition timing $Min_T$ are both set to the counter value 52. Analogously, the input signal $D_{in1}$ transits the voltage level when the counter value is 98 during the first period $P_1$ and keeps the voltage level during the second period $P_2$. The maximum transition timing $Max_T$ and the minimum transition timing $Min_T$ are both set to the counter value 98. The embodiment shown in FIG. 6 goes through steps 501, 503, and 521 of FIG. 5.

Figure 7:
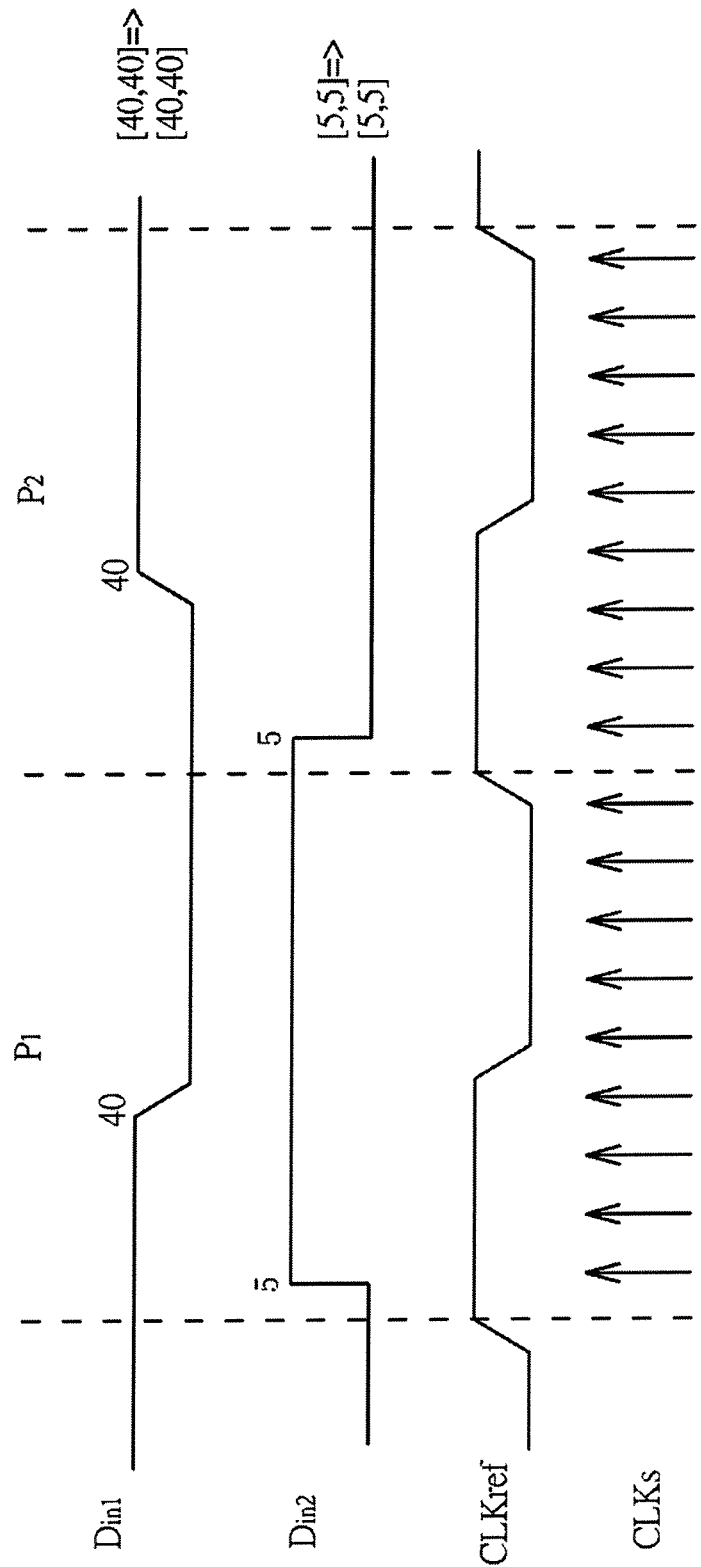

In the embodiment shown in FIG. 7, the input signal $D_{in1}$ transits the voltage level when the counter value equals 40 during the first period $P_1$. At this moment, the maximum transition timing $Max_T$ and the minimum transition timing $Min_T$ are both set to the counter value 40. After that, the input signal $D_{in1}$ transits the voltage level when the counter value equals 40 in the second period $P_2$ while the maximum transition timing $Max_T$ and the minimum transition timing $Min_T$ both remain at 40. Similarly, the input signal $D_{in2}$ transits the voltage level when the counter value equals 5 in both the first period $P_1$ and the second period $P_2$. The maximum transition timing $Max_T$ and the minimum transition timing $Min_T$ are both set to the counter value 5. In other words, if the input signal transits the voltage level at a first transition timing in consecutive periods, the first transition timing is set as the maximum transition timing $Max_T$ and the minimum transition timing $Min_T$. In the embodiment shown in FIG. 7, when the first transition timing occurs in the first period $P_1$, the flows goes through steps 501, 503, and 521 shown in FIG. 5. When the second transition timing occurs in the second period $P_2$, the flow goes through steps 501, 503, 505, 507, 509, 511, and 519.

In the embodiment shown in FIG. 8A, the input signal $D_{in1}$ transits the voltage level when the counter value equals 52 in the first period $P_1$ and transits the voltage level when the counter value equals 64 in the second period $P_2$. In this situation, the counter value 52 is set as minimum transition timing $Min_T$ and the counter value 64 is set as the maximum transition timing $Max_T$. Similarly, in the embodiment in FIG. 8B, the input signal $D_{in2}$ transits the voltage level when the counter value equals 74 during the first period $P_1$ and transits the voltage level when the counter value equals 66 during the second period $P_2$. In that situation, value 66 is set as the minimum transition timing $Min_T$ and value 74 is set as the maximum transition timing $Max_T$. In other words, if the input signal transits the voltage level at a first transition timing and at a consecutive second transition timing, and the time difference between the first and the second timing is less than a half period of the reference clock signal, the later one of the first and the second transition timings (e.g. the one having larger counter value) is set as the maximum transition timing $Max_T$, and, the earlier one of the first and the second transition timings (e.g. the one having smaller counter value) is set as the minimum transition timing $Min_T$. The first and the second transition timing may be in the same period however they may be in different periods. The embodiment shown in FIG. 8A firstly goes through steps 501, 503, and 521 (when the $Max_T$ and $Min_T$ are both 52) and continuously goes through 501, 503, 505, 507, 523, and 527 (at this step, the $Max_T$ is replaced as 64) The embodiment shown in FIG. 8B firstly goes through steps 501, 503, and 521 (when the $Max_T$ and $Min_T$ are both 74) and continuously goes through 501, 503, 505, 507, 509, 511, and 519 (at this step, the $Min_T$ is replaced as 64.)

Figure 9:
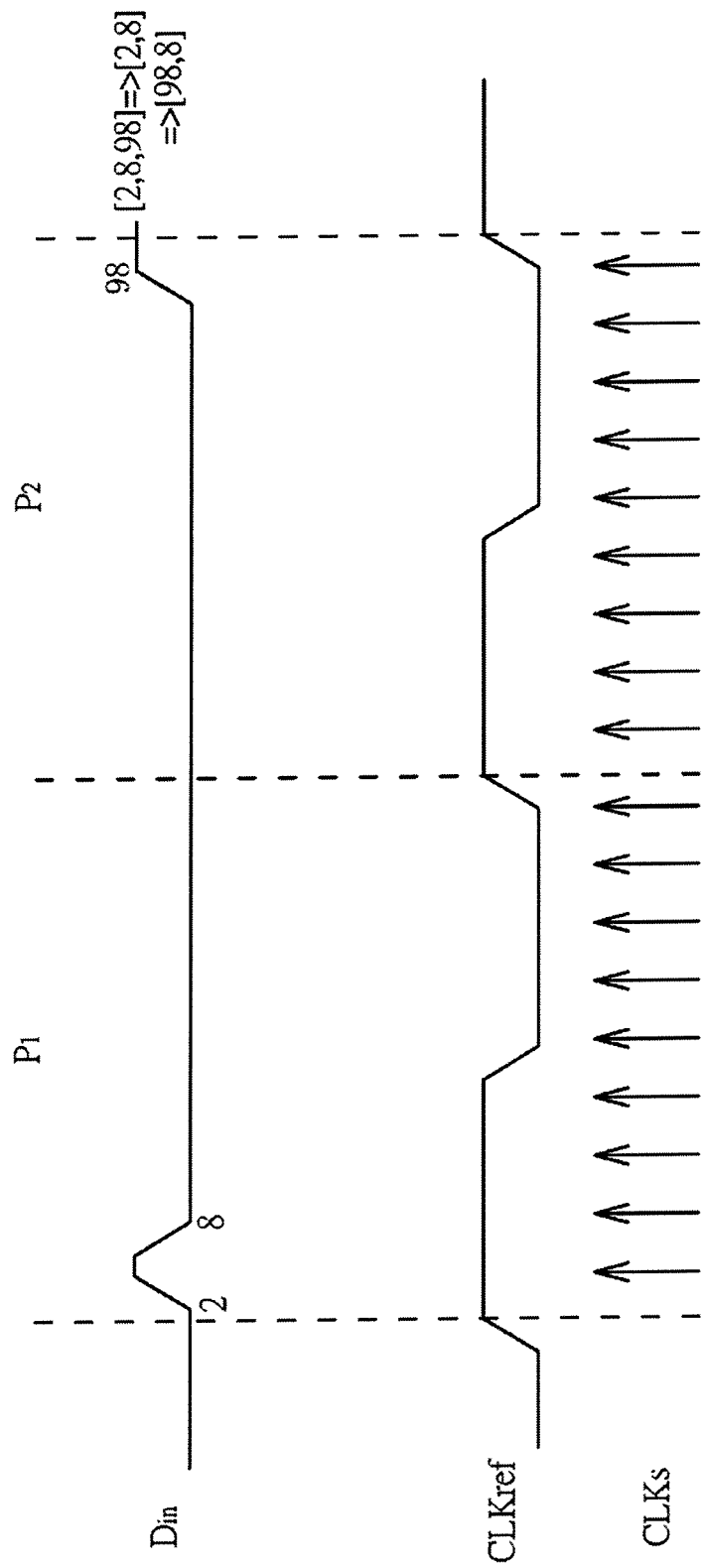

In the embodiment shown in FIG. 9, the input signal $D_{in}$ transits the voltage level when the counter value equals 2 and 8 (the first and the second transition timings, respectively) in the first period $P_1$. Similar to the embodiment in FIG. 8A, the counter value 2 is set as the minimum transition timing $Min_T$ and the counter value 8 is set as the maximum transition timing $Max_T$. Moreover, the input signal transits the voltage level for the third time when the counter value equals 98 (the third transition timing) in the second period $P_2$. It depends on the following steps to determine whether to set the third transition timing as the minimum transition timing $Min_T$ or the maximum transition timing $Max_T$.

In the case where the input signal transits the voltage level at a third transition timing and the third transition timing satisfies the following conditions, the third transition timing is set as the minimum transition timing $Min_T$. (1) The third transition timing occurs later than the time the maximum transition timing $Max_T$ (the counter value corresponding to the third transition timing is larger than the counter value of the maximum transition timing $Max_T$) plus one half of the period of the reference clock signal. (2) The minimum transition timing $Min_T$ occurs earlier than one half of the period of the reference clock signal.

In the embodiment shown in FIG. 9, the corresponding counter value with respect to one period of the reference clock signal equals 100. Since the counter value of the maximum transition timing $Max_T$ equals 8, the time the $Max_T$ plus one half of the period of the reference clock signal equals 58. The first condition (1) is satisfied. Furthermore, the counter value of the minimum transition timing $Min_T$ equals 2 and one half of the period of the reference timing clock equals 50, the second condition (2) is also met. Therefore the counter value 98 is set as the minimum transition timing $Min_T$. The flows corresponding to the first and the second transition timings of the embodiment in FIG. 9 are as the same as the flows of the embodiment shown in FIG. 8A. And the flow of the third transition timing goes through steps 501, 503, 505, 515, and 519 shown in FIG. 5.

Figure 10:
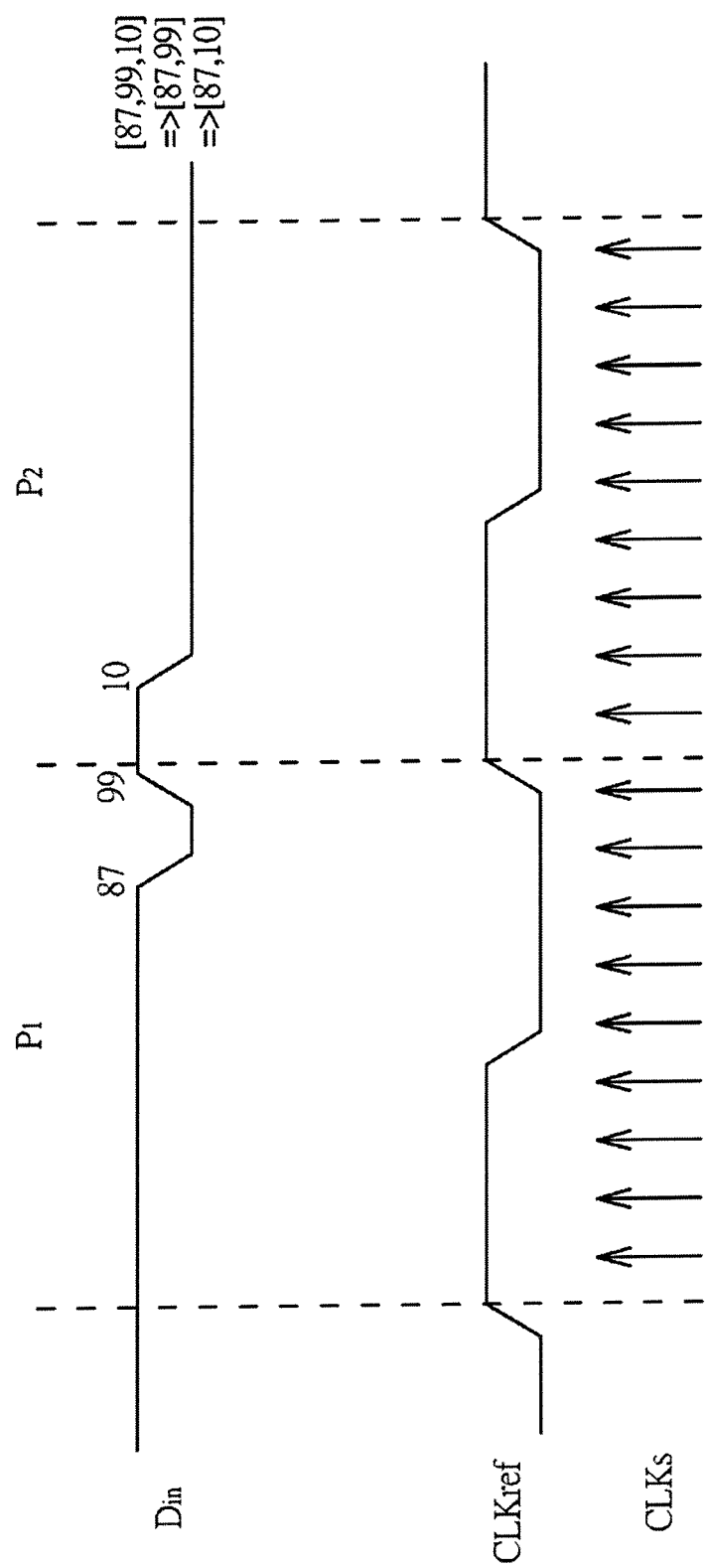

In the embodiment shown in FIG. 10, the input signal $D_{in}$ transits the voltage level when the counter value equals 87 and 99 (the first and the second transition timings, respectively) in the first period $P_1$. Similar to the embodiment in FIG. 8A, the counter value 87 is set as the minimum transition timing $Min_T$ and the counter value 99 is set as the maximum transition timing $Max_T$. The input signal $D_{in}$ transits the voltage level for the third time (the third transition timing) when the counter value equals 10 in the second period $P_2$. In such circumstance, it depends on the following steps to determine whether to set the third transition timing as the minimum transition timing $Min_T$ or the maximum transition timing $Max_T$.

In the case where the input signal transits the voltage level at a third transition timing and the third transition timing satisfies the following conditions, the third transition timing is set as the maximum transition timing $Max_T$. (1) The third transition timing occurs earlier than the time the maximum transition timing $Max_T$ plus one half of the period of the reference clock signal as well as earlier than the time the minimum transition timing $Min_T$ minus one half of the period of the reference clock signal. (2) The maximum transition timing occurs later than one half of the period of the reference clock signal.

In the embodiment shown in FIG. 10, the corresponding counter value with respect to one period of the reference clock signal equals 100. Since the counter value of the maximum transition timing $Max_T$ equals 99, the time the $Max_T$ plus one half of the period of the reference clock signal equals 149. And the counter value of the minimum transition timing $Min_T$ equals 87. So the time the minimum transition timing $Min_T$ minus one half of the period of the reference clock signal equals 37, which occurs later than the counter value ten (10) corresponding to the third transition timing. The first condition (1) is satisfied. Moreover, the counter value of the maximum transition timing $Max_T$ equals 99 and one half of the period of the reference clock signal is 50. Hence the second condition (2) is also met. In consequence, the value 10 is set as the maximum transition timing $Max_T$. The flows corresponding to the first and the second transition timings of the embodiment in FIG. 10 are as the same as the flows of the embodiment in FIG. 8A. And the flow of the third transition timing goes through steps 501, 503, 505, 507, 523, and 527 shown in FIG. 5.

Figure 11:
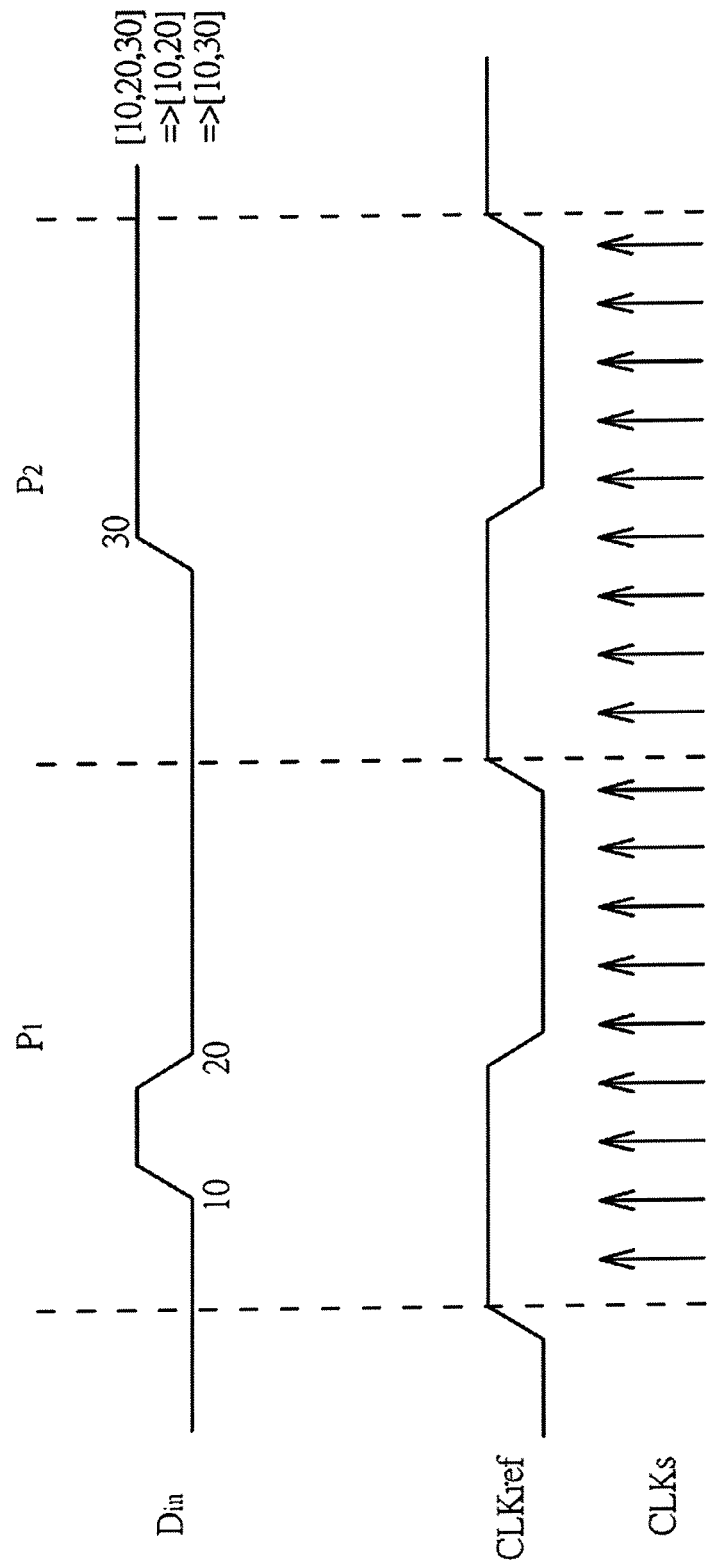

In the embodiment shown in FIG. 11, the input signal $D_{in}$ transits the voltage level when the counter value equals 10 and 20 (the first and the second transition timings, respectively) in the first period $P_1$. Similar to the embodiment shown in FIG. 8A, the counter value 10 is set as the minimum transition timing $Min_T$ and the counter value 20 is set as the maximum transition timing $Max_T$. The input signal $D_{in}$ transits the voltage level for the third time (the third transition timing) when the counter value equals 30 in the second period $P_2$. In such circumstance, it depends on the following steps to determine whether to set the third transition timing as the minimum transition timing $Min_T$ or the maximum transition timing $Max_T$.

In the case where the input signal transits the voltage level at a third transition timing and the third transition timing satisfies the following conditions, the third transition timing is set as the maximum transition timing $Max_T$. (1) The third transition timing occurs earlier than the time the maximum transition timing $Max_T$ plus one half of the period of the reference clock signal as well as later than the time the minimum transition timing $Min_T$ minus one half of the period of the reference clock signal. (2) The third transition timing occurs later than the maximum transition timing $Max_T$.

In the embodiment shown in FIG. 11, the corresponding counter value with respect to one period of the reference clock signal equals 100. Since the counter value of the maximum transition timing $Max_T$ equals 20, the time the $Max_T$ plus one half of the period of the reference clock signal equals 70. And the counter value of the minimum transition timing $Min_T$ equals 10. So the time the minimum transition timing $Min_T$ minus one half of the period of the reference clock signal equals −40. And the counter value of the third transition timing equals 30. The first condition (1) is satisfied. Moreover, the counter value of the third transition timing equals 20 and the maximum transition timing $Max_T$ equals 30. Hence the second condition (2) is also met. In consequence, the counter value 30 is set as the maximum transition timing $Max_T$. The flows corresponding to the first and the second transition timings of the embodiment in FIG. 11 are as the same as the flows of the embodiment in FIG. 8A. And the flow of the third transition timing goes through steps 501, 503, 505, 507, 509, and 527 in FIG. 5.

Figure 12:
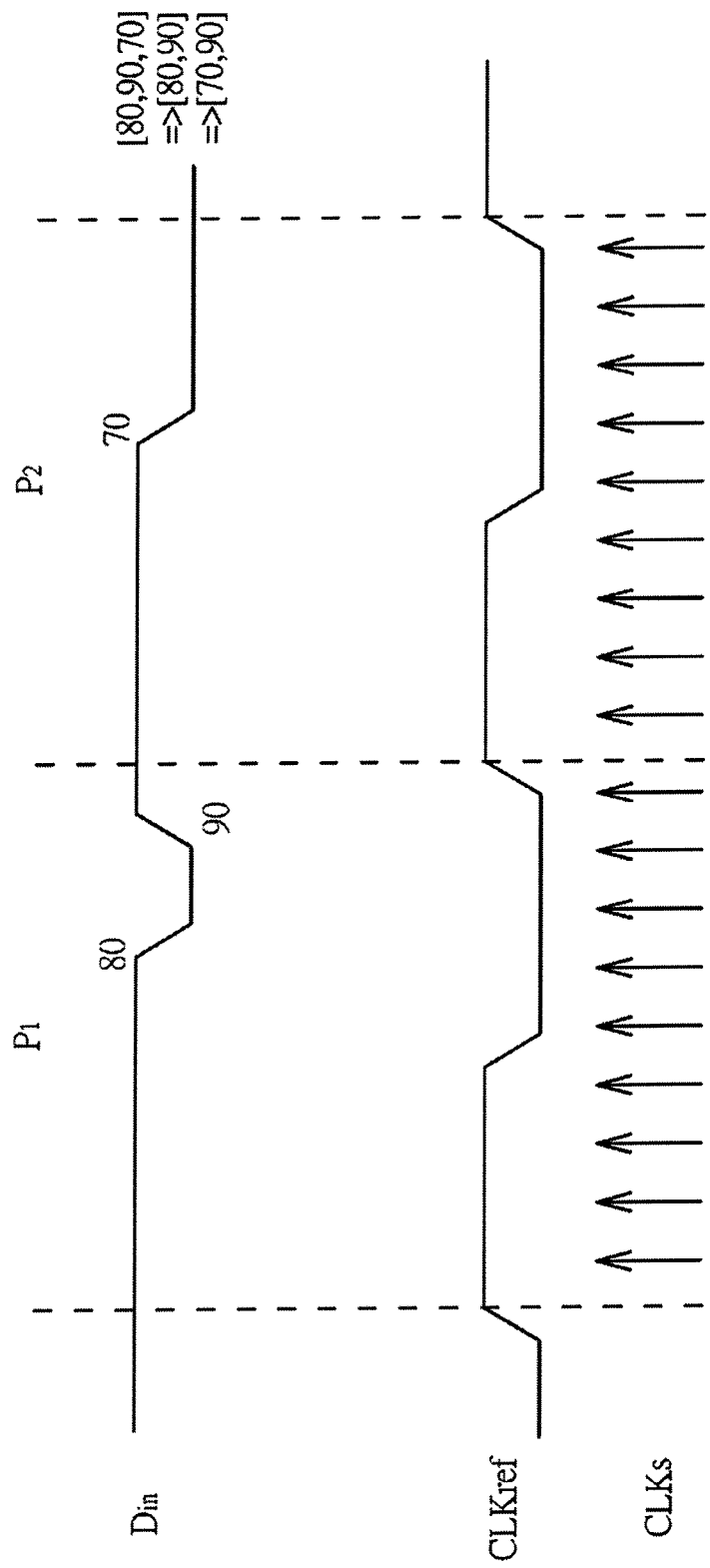

In the embodiment shown in FIG. 12, the input signal $D_{in}$ transits the voltage level when the counter value equals 80 and 90 (the first and the second transition timings, respectively) in the first period $P_1$. Similar to the embodiment in FIG. 8A, the counter value 80 is set as the minimum transition timing $Min_T$ and the counter value 90 is set as the maximum transition timing $Max_T$. The input signal $D_{in}$ transits the voltage level for the third time (the third transition timing) when the counter value equals 70 in the second period $P_2$. In such circumstance, it depends on the following steps to determine whether to set the third transition timing as the minimum transition timing $Min_T$ or the maximum transition timing $Max_T$.

In case the input signal transits the voltage level at a third transition timing and the third transition timing satisfies the following conditions, the third transition timing is set as the minimum transition timing $Min_T$. (1) The third transition timing occurs earlier than the time the maximum transition timing $Max_T$ plus one half of the period of the reference clock signal as well as later than the time the minimum transition timing $Min_T$ minus one half of the period of the reference clock signal. (2) The third transition timing occurs earlier than the minimum transition timing $Min_T$ and the maximum transition timing $Max_T$.

In the embodiment shown in FIG. 12, the corresponding counter value with respect to one period of the reference clock signal equals 100. Since the counter value of the maximum transition timing $Max_T$ equals 90, the time the $Max_T$ plus one half of the period of the reference clock signal equals 140. And the counter value of the minimum transition timing $Min_T$ equals 80. So the time the minimum transition timing $Min_T$ minus one half of the period of the reference clock signal equals 30. And the counter value of the third transition timing equals 70. The conditions (1) and (2) are satisfied. As a result, the counter value 70 is set as the maximum transition timing $Max_T$. The flows corresponding to the first and the second transition timings of the embodiment in FIG. 12 are as the same as the flows of the embodiment in FIG. 8A. And the flow of the third transition timing goes through steps 501, 503, 505, 507, 509, 511, and 519 in FIG. 5.

Figure 8B:
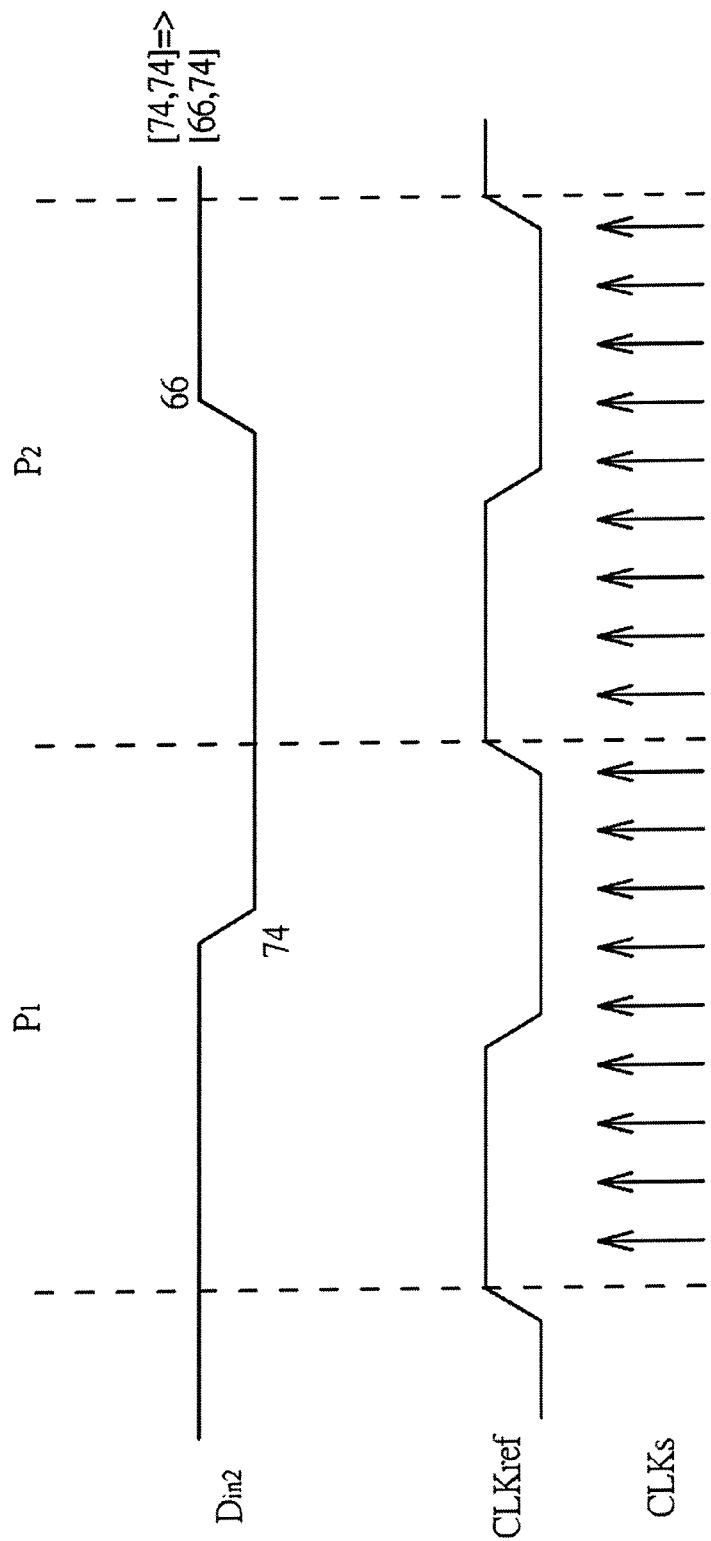

The embodiments shown in FIGS. 9 to 12 are extended embodiments in FIG. 8A or 8B. Please be aware that the first, the second, and the third transition timings in the embodiments in FIGS. 9 to 12 may be in the same time period of the reference clock signal. Alternatively, those transition timings may be in different time periods.

Figure 13A:
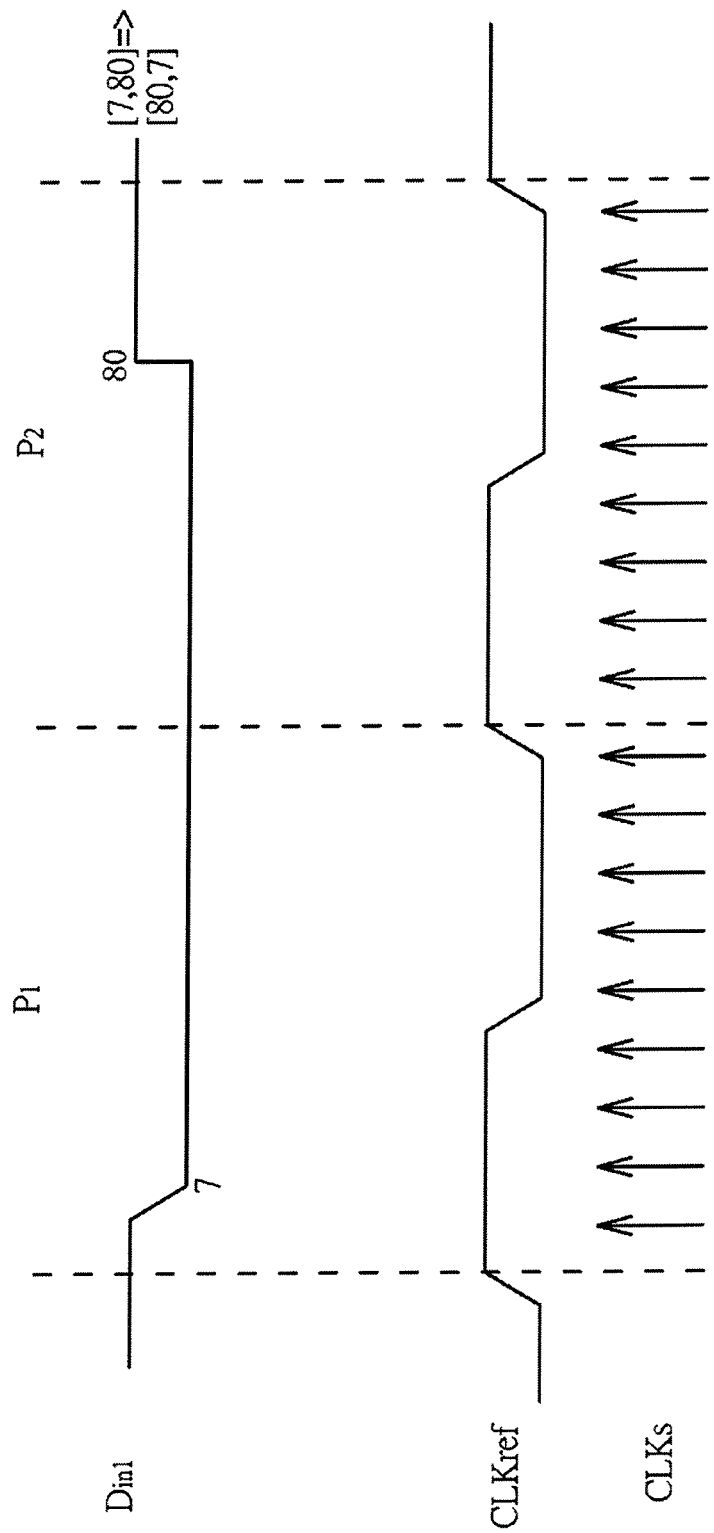

In the embodiment shown in FIG. 13A, the input signal $D_{in1}$ transits the voltage level for the first time when the counter value equals 7 in the first period $P_1$ and transits the voltage level for the second time when the counter value equals 80 in the second period $P_2$. If it follows the determination rules applicable to the embodiment in FIG. 8A, the counter value 7 is set as the minimum transition timing $Min_T$ and the counter value 80 is set as the maximum transition timing $Max_T$. However, the difference between 7 and 80 is longer than the counter value of one half of the period of the reference clock signal, 50, a reverse action should be applied. In other words, reversely, the counter value 80 is set as the minimum transition timing $Min_T$ and the counter value is set as the maximum transition timing $Max_T$. Similarly, in the embodiment shown in FIG. 13B, the input signal $D_{in2}$ transits the voltage level for the first time when the counter value equals 90 in the first period $P_1$ and transits the voltage level for the second time when the counter value equals 10 in the second period $P_2$. If it follows the determination rules applicable to the embodiment in FIG. 8A, the counter value 10 is set as the minimum transition timing $Min_T$ and the counter value 90 is set as the maximum transition timing $Max_T$. However, the difference between 10 and 90 is longer than the counter value of one half of the period of the reference clock signal, 50, a reverse action should be applied. In other words, reversely, the counter value 90 is set as the minimum transition timing $Min_T$ and the counter value 10 is set as the maximum transition timing $Max_T$. Put it in this way. In the case where the input signal transits the voltage level at a first transition timing and a consecutive second transition timing, and if the difference between the first and the second transition timing is longer than one half of the period of the reference clock signal, t the smaller one or the earlier one of the first and the second transition timings would be set as the maximum transition timing $Max_T$ and the larger one or the later one of the first and the second transition timings would be set as the minimum transition timing $Min_T$. The first and the second transition timings may be in the same time period or alternatively in different time periods. Firstly, the flow of the embodiment shown in FIG. 13A goes through steps 501, 503, and 521 ($Max_T$ and $Min_T$ are both 7) and continues to go through steps 501, 503, 505, 515, and 519 ($Min_T$ is replaced as 80) in FIG. 5. Moreover, the flow of the embodiment in FIG. 13B firstly goes through steps 501, 503, and 521 ($Max_T$ and $Min_T$ are both 90) and continues to go through steps 501, 503, 505, 507, 523, and 527 ($Max_T$ is replaced as 10) in FIG. 5.

Figure 14:
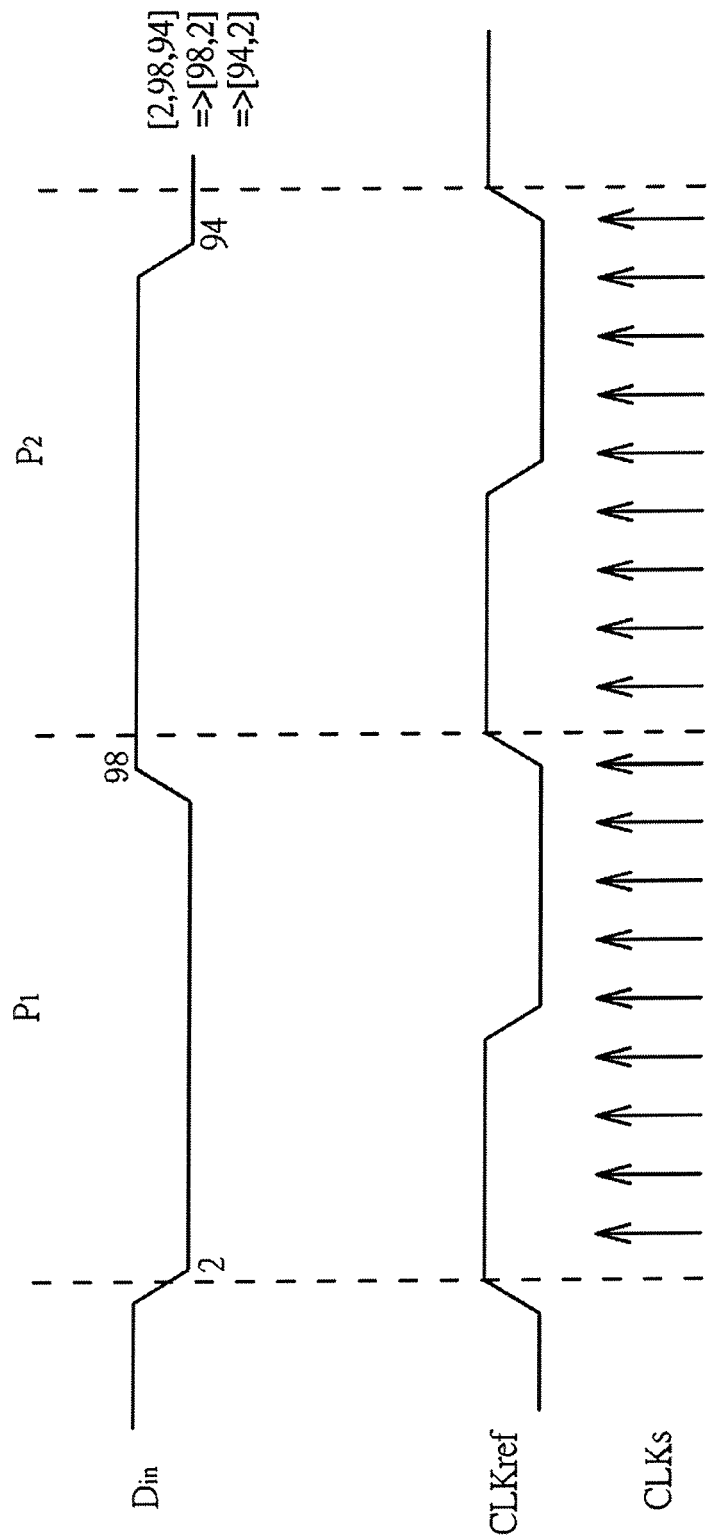

In the embodiment shown in FIG. 14, the input signal $D_{in}$ transits the voltage level when the counter value equals 2 and 98 (the first and the second transition timings, respectively) in the first period $P_1$. Similar to the embodiment in FIG. 13A, the counter value 98 is set as the minimum transition timing $Min_T$ and the counter value 2 is set as the maximum transition timing $Max_T$. The input signal $D_{in}$ transits the voltage level for the third time (the third transition timing) when the counter value equals 94 in the second period $P_2$. In such circumstance, it depends on the following steps to determine whether to set the third transition timing as the minimum transition timing $Min_T$ or the maximum transition timing $Max_T$.

In the case where the input signal transits the voltage level at a third transition timing and the third transition timing satisfies the following conditions, the third transition timing is set as the minimum transition timing $Min_T$. (1) The third transition timing occurs later than the time the maximum transition timing $Max_T$ plus one half of the period of the reference clock signal. (2) The minimum transition timing $Min_T$ occurs later than one half of the period of the reference clock signal. (3) The third transition timing occurs earlier than the minimum transition timing $Min_T$.

In the embodiment shown in FIG. 14, the corresponding counter value with respect to one period of the reference clock signal equals 100. Since the counter value of the maximum transition timing $Max_T$ equals 2, the time the $Max_T$ plus one half of the period of the reference clock signal equals 52. And the counter value of the third transition timing equals 94. So the condition (1) is satisfied. Furthermore, the counter value of the minimum transition timing $Min_T$ equals 98. The counter value of one half of the period of the reference clock signal equals 50 and the third transition timing equals 94. Therefore the conditions (2) and (3) are both met. As a result, the counter value 94 is set as the minimum transition timing $Min_T$. The flows corresponding to the first and the second transition timings of the embodiment in FIG. 14 are as the same as the flows of the embodiment in FIG. 13A. And the flow of the third transition timing goes through steps 501, 503, 505, 515, 517, and 519 shown in FIG. 5.

Figure 15:
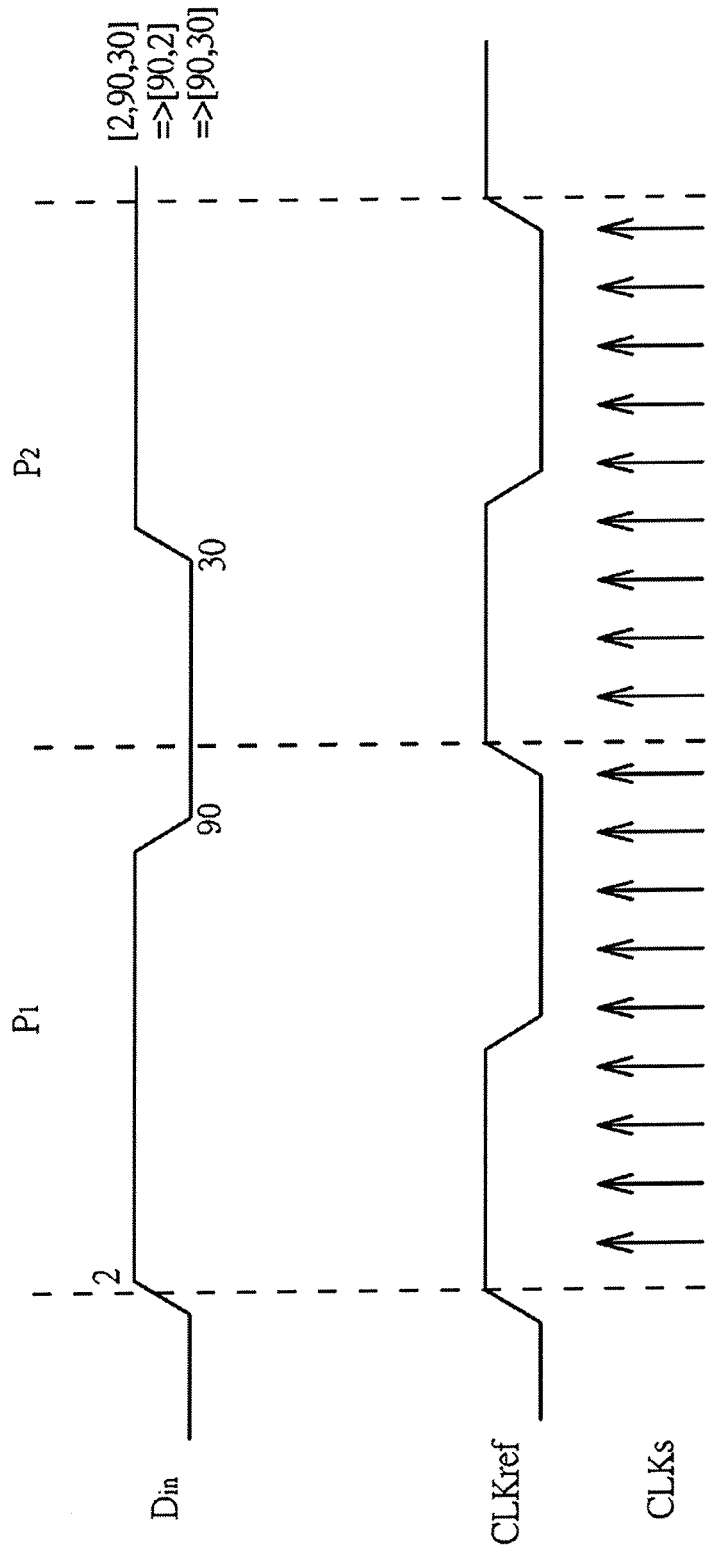

In the embodiment shown in FIG. 15, the input signal $D_{in}$ transits the voltage level when the counter value equals 2 and 90 (the first and the second transition timings, respectively) in the first period $P_1$. Similar to the embodiment shown in FIG. 13A, the counter value 90 is set as the minimum transition timing $Min_T$ and the counter value 2 is set as the maximum transition timing $Max_T$. The input signal $D_{in}$ transits the voltage level for the third time (the third transition timing) when the counter value equals 30 in the second period $P_2$. In such circumstance, it depends on the following steps to determine whether to set the third transition timing as the minimum transition timing $Min_T$ or the maximum transition timing $Max_T$.

In case the input signal transits the voltage level at a third transition timing and the third transition timing satisfies the following conditions, the third transition timing is set as the maximum transition timing $Max_T$. (1) The third transition timing occurs earlier than the time the maximum transition timing $Max_T$ plus one half of the period of the reference clock signal as well as earlier than the time the minimum transition timing $Min_T$ minus one half of the period of the reference clock signal. (2) The maximum transition timing $Max_T$ occurs earlier than one half of the period of the reference clock signal. (3) The third transition timing occurs later than the maximum transition timing $Max_T$.

In the embodiment shown in FIG. 15, the corresponding counter value with respect to one period of the reference timing clock equals 100. Since the counter value of the maximum transition timing $Max_T$ equals 2, the time the $Max_T$ plus one half of the period of the reference clock signal equals 52. And the counter value of the minimum transition timing $Min_T$ equals 90. As a result, the time the minimum transition timing $Min_T$ minus one half of the period of the reference clock signal equals 40. Because the counter value of the third transition timing equals 30, the condition (1) is satisfied. Furthermore, the counter value of the maximum transition timing $Max_T$ equals 2. The counter value of one half of the period of the reference clock signal equals 50 and the third transition timing equals 30. Therefore the conditions (2) and (3) are both met. As a result, the counter value 30 is set as the maximum transition timing $Max_T$. The flows corresponding to the first and the second transition timings of the embodiment in FIG. 15 are as the same as the flows of the embodiment in FIG. 13A. And the flow of the third transition timing goes through steps 501, 503, 505, 507, 523, 525, and 527 in FIG. 5.

Figure 13B:
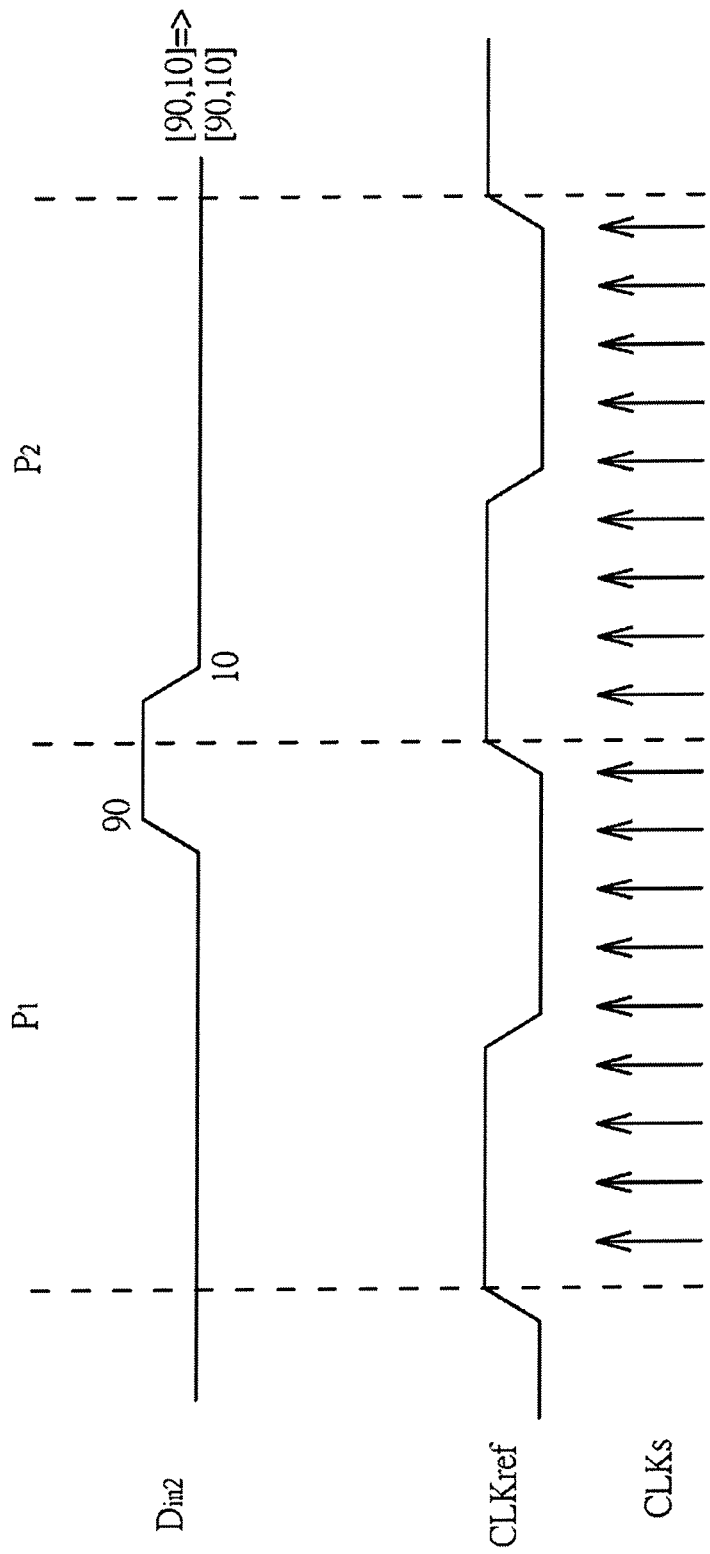

The fore-mentioned embodiments in FIGS. 14 and 15 are extended examples of embodiments in FIG. 13A or 13B. Please be noted that the first, the second, and the third transition timings in the embodiments shown in FIGS. 14 to 15 may be in the same time period of the reference clock signal. Alternatively, those transition timings may be in different time periods.

Figure 16:
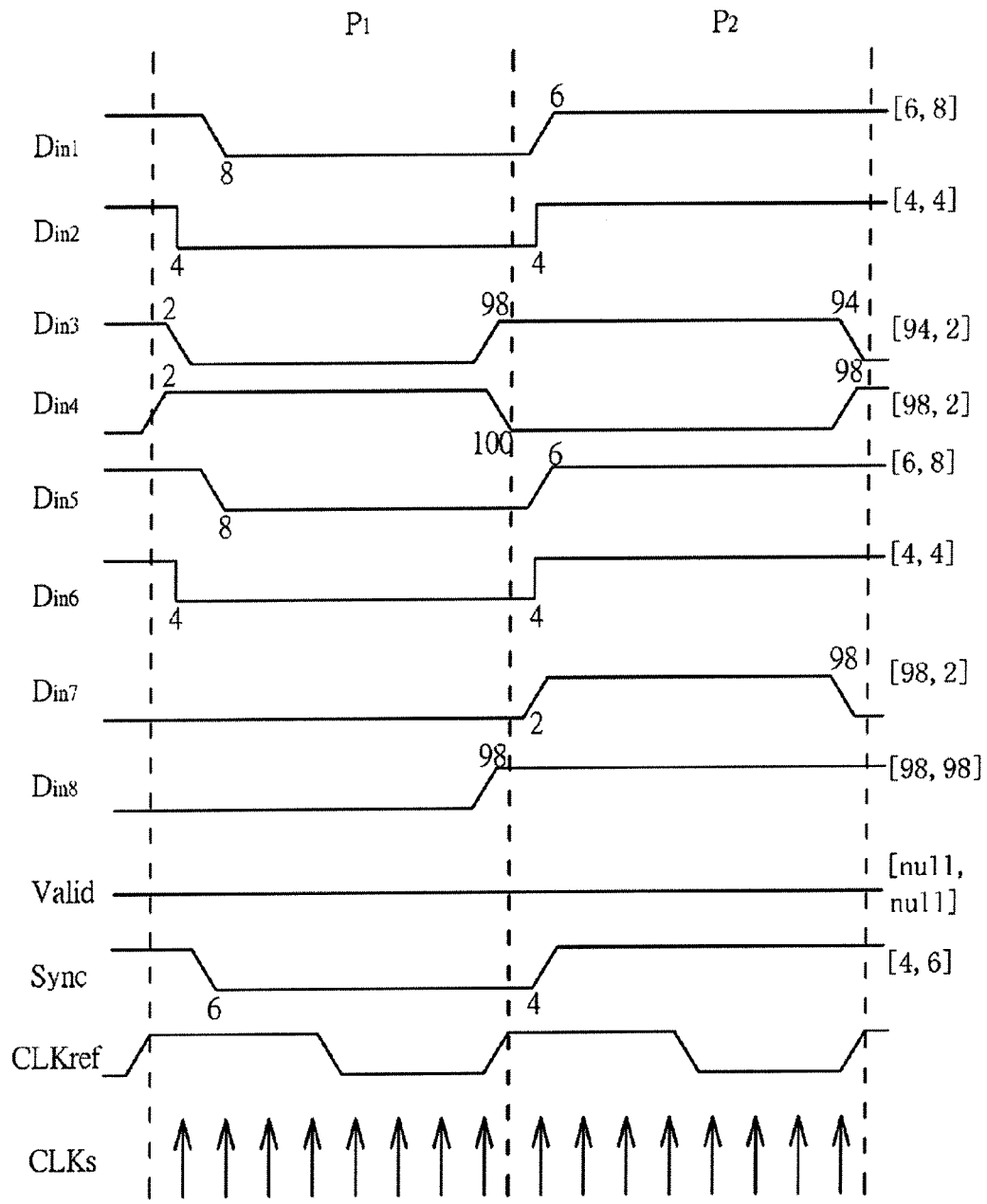
FIG. 16 is a diagram shows concurrent processing of multiple signals by the signal sampling method provided by the present invention.

The signal sampling method provided by the present invention does not limit the signal processing once at a time. It can apply to multiple concurrent signal processing. The types of processed signal include but not restrict to TV data signal. The applicable signal may be synchronized and validated. Please refer to FIG. 16, which shows a diagram of concurrent processing multiple signals by the signal sampling method provided by the present invention. As shown in FIG. 16, multiple voltage level transition intervals corresponding to multiple input signals $D_{in1}$ to $D_{in8}$ (all of them are data signal in this embodiment) are detected concurrently. Besides, a validation signal Valid and a synchronization signal Sync are also considered. The validation signal is configured to denote whether the data signal is valid. And the synchronization signal Sync is used to synchronize the transmission of data signals.

Figure 17:
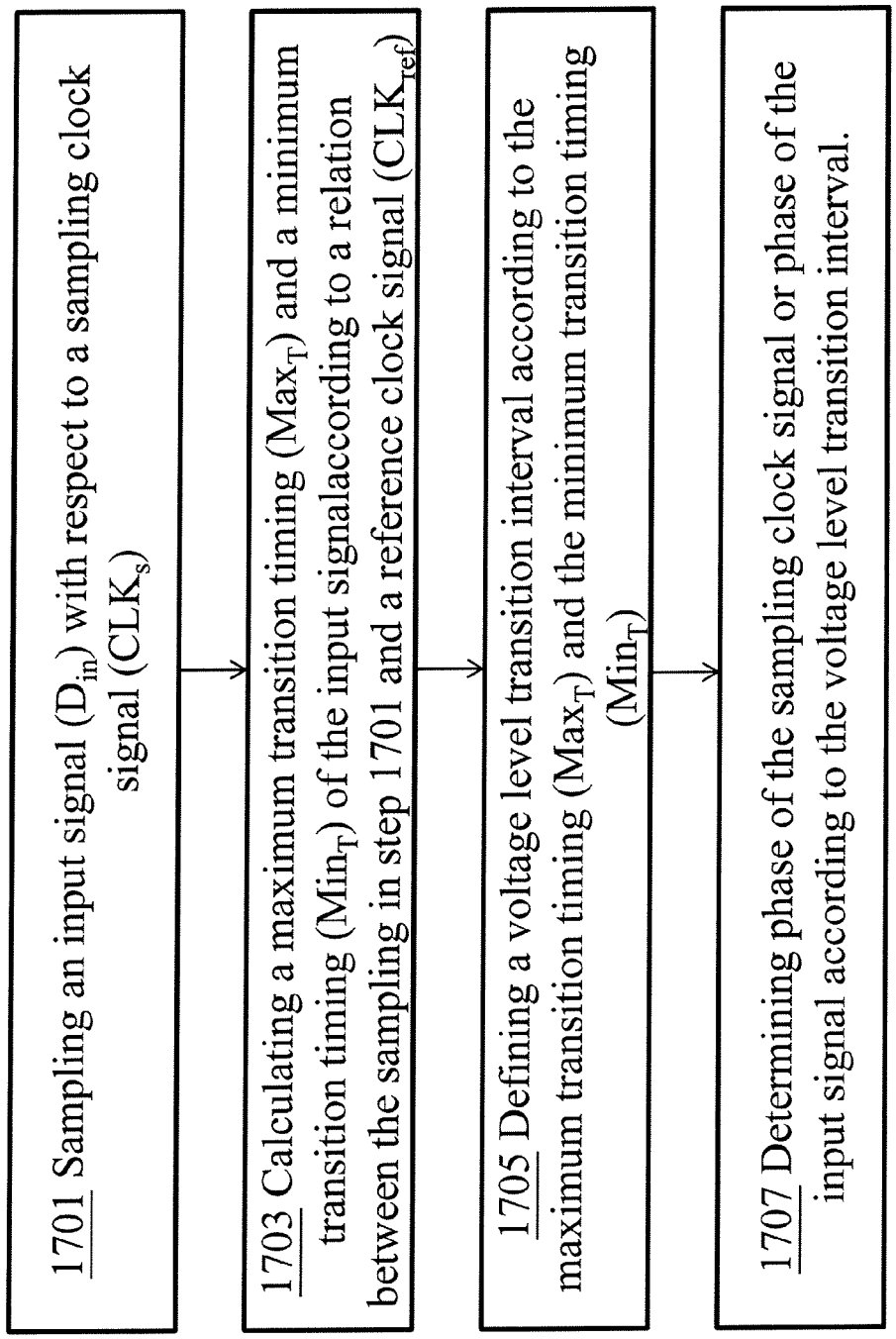
FIG. 17 is a flowchart diagram shows a signal sampling method in accordance with an embodiment of the present invention.

According to the fore-mentioned embodiments, a signal sampling method is concluded as steps shown in FIG. 17.

Step 1701: Sampling an input signal ($D_{in}$) with respect to a sampling clock signal ($CLK_s$).

Step 1703: Calculating a maximum transition timing ($Max_T$) and a minimum transition timing ($Min_T$) of the input signal according to a relation between the sampling in step 1701 and a reference clock signal ($CLK_{ref}$).

Step 1705: Defining a voltage level transition interval according to the maximum transition timing ($Max_T$) and the minimum transition timing ($Min_T$).

Step 1707: Determining phase of the sampling clock signal or phase of the input signal according to the voltage level transition interval.

Figure 18:
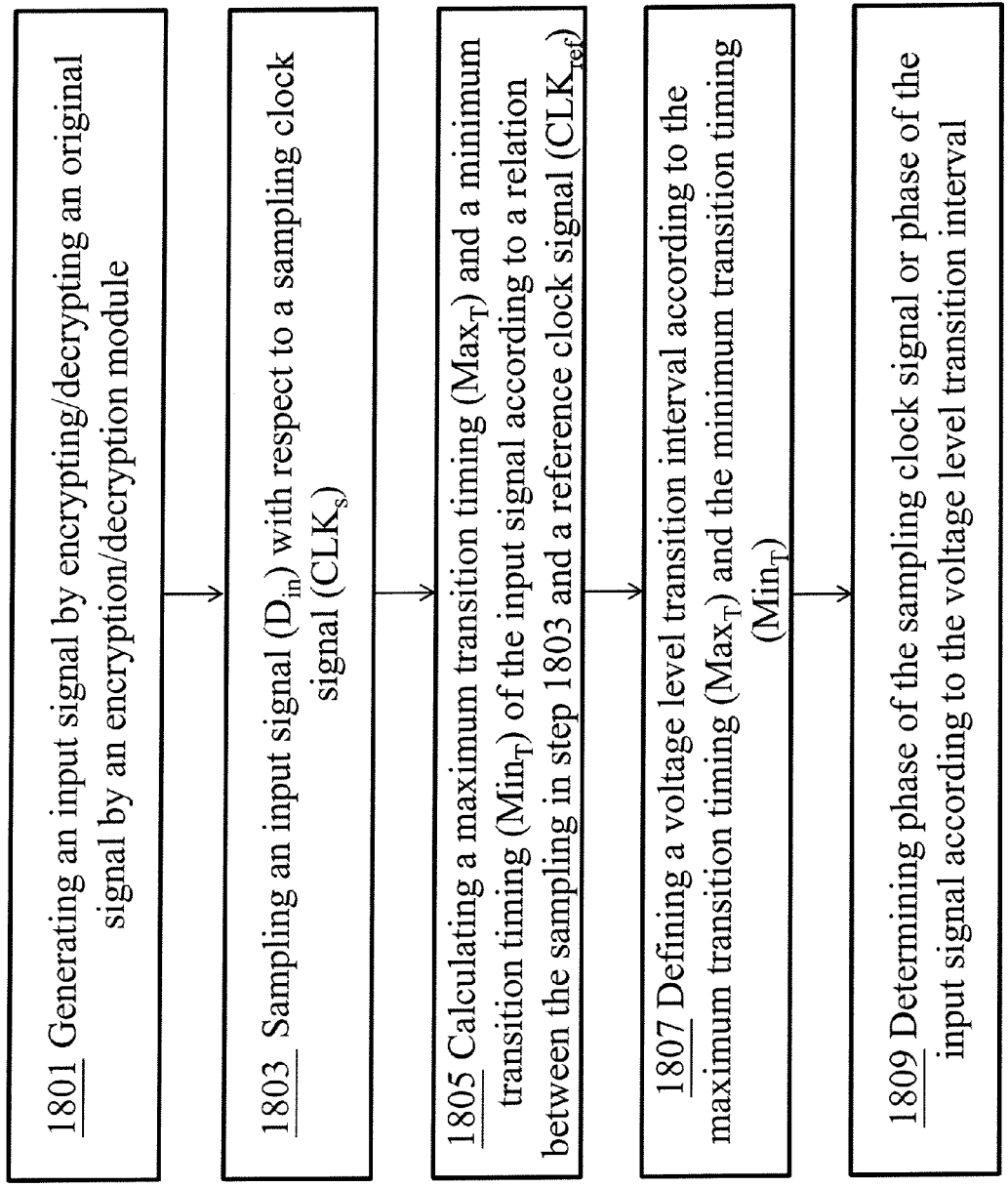
FIG. 18 is a flowchart diagram shows a signal encryption/decryption method in accordance with an embodiment of the present invention.

According to the fore-mentioned embodiments, a signal sampling method is concluded as steps shown in FIG. 18.

Step 1801: Generating an input signal by encrypting/decrypting an original signal (as $D_{or}$ shown in FIG. 3) by an encryption/decryption module.

Step 1803: Sampling the input signal ($D_{in}$) with respect to a sampling clock signal ($CLK_s$).

Step 1805: Calculating a maximum transition timing ($Max_T$) and a minimum transition timing ($Min_T$) of the input signal according to a relation between the sampling in step 1803 and a reference clock signal ($CLK_{ref}$).

Step 1807: Defining a voltage level transition interval according to the maximum transition timing ($Max_T$) and the minimum transition timing ($Min_T$).

Step 1809: Determining phase of the sampling clock signal according to the voltage level transition interval or controlling the encryption/decryption module for changing phase of the input signal according to the voltage level transition interval.

According to the fore-mentioned embodiments, an interval of possible voltage level transition occurs to an input signal can be detected such that samplings are performed at more appropriate timings. Moreover, a determination flow is provided in accordance with the present invention for determining the most precise voltage level transition interval in various signal circumstances.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:
1. A signal sampling method, comprising:
  (a) sampling an input signal with respect to a sampling clock signal;
  (b) calculating a maximum transition timing and a minimum transition timing of the input signal according to a relation between the sampling in step (a) and a reference clock signal;
  (c) defining a voltage level transition interval according to the maximum transition timing and the minimum transition timing; and

(d) determining phase of the sampling clock signal or phase of the input signal according to the voltage level transition interval, wherein the step (b) further comprises:

setting an earlier one of a first transition timing and a second transition timing as the minimum transition timing and setting the other one of the first transition timing and the second transition timing as the maximum transition timing if the input signal transits the voltage level at the first transition timing and the consecutive second transition timing and difference between the first transition timing and the second transition timing is shorter than one half of the period of the reference clock signal, and wherein the step (b) further comprises:

setting a third transition timing as the maximum transition timing if the input signal transits the voltage level at the third transition timing when the third transition timing occurs earlier than the time the maximum transition timing plus one half of the period of the reference clock signal as well as earlier than the time the minimum transition timing minus one half of the period of the reference signal clock, and, when the maximum transition time period occurs later than one half of the period of the reference clock signal.

2. The method claim 1, further comprising:

accumulating a counter value each time the sampling in step (a) is detected from when a specific voltage level transition timing of the reference clock signal occurs;

calculating the maximum transition timing and the minimum transition timing according to the counter value; and resetting the counter value when a next specific voltage level transition timing occurs.

3. The method of claim 1, wherein the step (b) further comprises:

setting a first transition timing as the maximum transition timing and the minimum transition timing if the maximum transition timing and the minimum transition timing both are zero and also the input signal transits the voltage level at the first transition timing.

4. The method of claim 1, wherein the step (b) further comprises:

setting a first transition timing as the maximum transition timing and the minimum transition timing if the input signal transits the voltage level at the first transition timing in consecutive time periods.

5. The method of claim 1, wherein the step (b) further comprises:

setting a third transition timing as the minimum transition timing if the input signal transits the voltage level at the third transition timing when the third transition timing occurs later than the time the maximum transition timing plus one half of the period of the reference clock signal and when the minimum transition timing occurs earlier than one half of the period of the reference clock signal.

6. The method of claim 1, wherein the step (b) further comprises:

setting a third transition timing as the maximum transition timing if the input signal transits the voltage level at the third transition timing when the third transition timing occurs earlier than the time the maximum transition timing plus one half of the period of the reference clock signal as well as later than the time the minimum transition timing minus one half of the time period of the reference clock signal, and, when the third transition timing occurs later than the maximum transition timing.

7. The method of claim 1, wherein the step (b) further comprises:

setting a third transition timing as the minimum transition timing if the input signal transits the voltage level at the third transition timing when the third transition timing occurs earlier than the time the maximum transition plus one half of the period of the reference clock signal as well as later than the time the minimum transition timing minus one half of the period of the reference clock signal, and, when the third transition timing occurs earlier than the minimum transition timing and the maximum transition timing.

8. The method of claim 1, wherein the step (b) further comprises:

setting an later one of a first transition timing and a second transition timing as the minimum transition timing and setting an earlier one of the first transition timing and the second transition timing as the maximum transition timing if the input signal transits the voltage level at the first transition timing and the consecutive second transition timing and difference between the first transition timing and the second transition timing is longer than one half of the period of the reference clock signal.

9. The method of claim 8, wherein the step (b) further comprises:

setting a third transition timing as the minimum transition timing if the input signal transits the voltage level at the third transition timing when the third transition timing occurs later than the time the maximum transition timing plus one half of the period of the reference clock signal and when the minimum transition timing occurs later than one half of the period of the reference clock signal, and, when the third transition timing occurs earlier than the minimum transition timing.

10. The method of claim 8, wherein the step (b) further comprises:

setting a third transition timing as the maximum transition timing if the input signal transits the voltage level at the third transition timing when the third transition timing occurs earlier than the time the maximum transition timing plus one half of the period of the reference clock signal as well as earlier than the time the minimum transition timing minus a half of the time period of the reference clock signal, and when the maximum transition timing occurs earlier than a half of the time period of the reference clock signal, and when the third transition timing occurs later than the maximum transition timing.

11. A signal sampling device, comprising:

a sampling circuit, configured for sampling an input signal with respect to a sampling clock signal; and a control unit, configured for calculating a maximum transition timing and a minimum transition timing of the input signal according to a relation between the sampling in the sampling step performed by the sampling circuit and a reference clock signal; defining a voltage level transition interval according to the maximum transition timing and the minimum transition timing; and determining phase of the sampling clock signal or phase of the input signal according to the voltage level transition interval, wherein the control unit is further configured for setting an earlier one of a first transition timing and a second transition timing as the minimum transition timing and setting the other one of the first transition timing and the second transition timing as the maximum transition timing if the input signal transits the voltage levels at the first transition timing and the consecutive second transition timing and difference between the first transition timing and the second transition timing is shorter than one half of the period of the reference clock signal, and wherein the control unit is further configured for setting a third transition timing as the maximum transition timing if the input signal transits the voltage level at the third transition timing when the third transition timing occurs earlier than the time the maximum transition timing plus one half of the period of the reference clock signal as well as earlier than the time the minimum transition timing minus one half of the period of the reference clock signal and when the maximum transition time period occurs later than one half of the period of the reference clock signal.

12. The signal sampling device of claim 11, further comprises a counter, wherein the counter is configured for accumulating a counter value each time the sampling in the sampling step is detected from when a specific voltage level transition timing of the reference clock signal occurs, wherein the control unit is further configured for calculating the maximum transition timing and the minimum transition timing according to the counter value; and resetting the counter value when a next specific voltage level transition timing occurs.

13. The signal sampling device of claim 11, wherein the control unit is further configured for setting a first transition timing as the maximum transition timing and the minimum transition timing if the maximum transition timing and the minimum transition timing both are zero and also the input signal transits the voltage level at the first transition timing.

14. The signal sampling device of claim 11, wherein the control unit is further configured for setting a first transition timing as the maximum transition timing and the minimum transition timing if the input signal transits the voltage level at the first transition timing in consecutive time periods.

15. The signal sampling device of claim 11, wherein the control unit is further configured for setting a third transition timing as the minimum transition timing if the input signal transits the voltage level at the third transition timing when:
the third transition timing occurs later than the time the maximum transition timing plus one half of the period of the reference clock signal and when the minimum transition timing is earlier than one half time period of the reference clock signal.

16. The signal sampling device of claim 11, wherein the control unit is further configured for setting a third transition timing as the maximum transition timing if the input signal transits the voltage level at the third transition timing when the third transition timing occurs earlier than the time the maximum transition timing plus one half of the period of the reference clock signal as well as later than the time the minimum transition timing minus one half of the period of the reference clock signal and when the third transition timing occurs later than the maximum transition timing.

17. The signal sampling device of claim 11, wherein the control unit is further configured for setting a third transition timing as the minimum transition timing if the input signal transits the voltage level at the third transition timing when the third transition timing occurs earlier than the time the maximum transition plus one half of the period of the reference clock signal as well as later than the time the minimum transition timing minus one half of the period of the reference clock signal, and, when the third transition timing occurs earlier than the minimum transition timing and the maximum transition timing.

18. The signal sampling device of claim 11, wherein the control unit is further configured for setting an later one of a first transition timing and a second transition timing as the minimum transition timing and setting an earlier one of the first transition timing and the second transition timing as the maximum transition timing if the input signal transits the voltage level at the first transition timing and the consecutive second transition timing and difference between the first transition timing and the second transition timing is longer than one half of the period of the reference clock signal.

19. The signal sampling device of claim 18, wherein the control unit is further configured for setting a third transition timing as the minimum transition timing if the input signal transits the voltage level at the third transition timing when the third transition timing occurs later than the time the maximum transition timing plus one half of the period of the reference clock signal and when the minimum transition timing occurs later than one half of the period of the reference clock signal, and when the third transition timing occurs earlier than the minimum transition timing.

20. The signal sampling device of claim 18, wherein the control unit is further configured for setting a third transition timing as the maximum transition timing if the input signal transits the voltage level at the third transition timing when the third transition timing occurs earlier than the time the maximum transition timing plus one half of the period of the reference clock signal as well as earlier than the time the minimum transition timing minus one half of the period of the reference clock signal, and when the maximum transition timing occurs earlier than a half time period of the reference clock signal, and when the third transition timing occurs later than the maximum transition timing.

21. A signal encryption/decryption method, comprising:
(a) generating an input signal by encrypting/decrypting an original signal by an encryption/decryption module;
(b) sampling the input signal with respect to a sampling clock signal;
(c) calculating a maximum transition timing and a minimum transition timing of the input signal according to a relation between the sampling in step (b) and a reference clock signal;
(d) defining a voltage level transition interval according to the maximum transition timing and the minimum transition timing; and
(e) controlling the encryption/decryption module for changing phase of the input signal according to the voltage level transition interval.

22. A signal encryption/decryption device, comprising:
an encryption/decryption module, configured to generate an input signal by encrypting/decrypting an original signal;
a sampling circuit, configured to sample the input signal with a sampling clock signal; and
a control unit, configured to calculate a maximum transition timing and a minimum transition timing of the input signal according to a relation between the sampling by the sampling circuit and a reference clock signal, and configured to control the encryption/decryption module for changing phase of the input signal according to the voltage level transition interval.

* * * * *